(12) United States Patent
Kraft et al.

(10) Patent No.: US 10,584,637 B2
(45) Date of Patent: Mar. 10, 2020

(54) GAS TURBINE EFFICIENCY AND REGULATION SPEED IMPROVEMENTS USING SUPPLEMENTARY AIR SYSTEM CONTINUOUS AND STORAGE SYSTEMS AND METHODS OF USING THE SAME

(71) Applicant: PowerPHASE LLC, Jupiter, FL (US)

(72) Inventors: Robert J. Kraft, Tequesta, FL (US);
Scott Auerbach, Jupiter, FL (US);
Peter A. Sobieski, Seabrook, TX (US);
Sergio Arias-Quintero, Jupiter, FL (US)

(73) Assignee: POWERPHASE LLC, Jupiter, FL (US)

( * ) Notice: Subject to any disclaimer, the term of this patent is extended or adjusted under 35 U.S.C. 154(b) by 307 days.

(21) Appl. No.: 15/794,973

(22) Filed: Oct. 26, 2017

(65) Prior Publication Data
US 2018/0058326 A1 Mar. 1, 2018

Related U.S. Application Data

(60) Division of application No. 14/329,340, filed on Jul. 11, 2014, now Pat. No. 9,803,548, which is a
(Continued)

(51) Int. Cl.
*F02C 7/14* (2006.01)
*F02C 7/10* (2006.01)
(Continued)

(52) U.S. Cl.
CPC ............... *F02C 7/10* (2013.01); *F01C 13/04* (2013.01); *F01K 23/02* (2013.01);
(Continued)

(58) Field of Classification Search
CPC .. F02B 29/0443; F02B 29/0437; F02B 67/04; F02B 67/06; F01C 13/04; F01P 2060/02
See application file for complete search history.

(56) References Cited

U.S. PATENT DOCUMENTS 3,359,723 A 12/1967 Bohensky et al.
3,831,373 A 8/1974 Flynt
(Continued)

FOREIGN PATENT DOCUMENTS

CN 101900101 A 12/2010
GB 776269 A * 6/1957
(Continued)

*Primary Examiner* — Gerald L Sung
*Assistant Examiner* — Rene D Ford
(74) *Attorney, Agent, or Firm* — Lathop GPM LLP; Hissan Anis

(57) ABSTRACT

A method of cooling a gas fueled engine driven intercooled air compressor comprises providing the intercooled air compressor, a gearbox, and the gas fueled engine. The method includes flowing a liquid coolant from a liquid coolant supply to each of the gearbox and an intercooler of the intercooled air compressor. The method comprises recombining the liquid coolant after the gearbox and the intercooler. The method includes directing the recombined liquid coolant via multiple paths to cool the gas fueled engine. The method comprises recombining the liquid coolant after the liquid coolant has passed through the multiple paths.

20 Claims, 15 Drawing Sheets

Related U.S. Application Data continuation-in-part of application No. 14/350,469, filed as application No. PCT/US2013/034748 on Mar. 31, 2013, now Pat. No. 9,695,749.

(60) Provisional application No. 61/686,222, filed on Apr. 2, 2012.

(51) Int. Cl.

| | | |
|---|---|---|
| *F02C 6/16* | (2006.01) | |
| *F02C 9/16* | (2006.01) | |
| *F02C 6/06* | (2006.01) | |
| *F01K 23/02* | (2006.01) | |
| *F02C 7/224* | (2006.01) | |
| *F02B 29/04* | (2006.01) | |
| *F02B 67/04* | (2006.01) | |
| *F01C 13/04* | (2006.01) | |
| *F02C 6/08* | (2006.01) | |
| *F02C 7/143* | (2006.01) | |

(52) U.S. Cl.
CPC .......... *F02B 29/0443* (2013.01); *F02B 67/04* (2013.01); *F02C 6/06* (2013.01); *F02C 6/16* (2013.01); *F02C 7/224* (2013.01); *F02C 9/16* (2013.01); *F01P 2060/02* (2013.01); *F02C 6/08* (2013.01); *F02C 7/143* (2013.01); *F05D 2260/213* (2013.01); *F05D 2270/05* (2013.01); *F05D 2270/08* (2013.01); *Y02E 20/14* (2013.01); *Y02E 20/16* (2013.01); *Y02E 60/15* (2013.01); *Y02T 50/675* (2013.01)

(56) References Cited

U.S. PATENT DOCUMENTS

| | | | |
|---|---|---|---|
| 4,565,175 A * | 1/1986 | Kaye | F01P 3/20 123/542 |
| 5,375,580 A | 12/1994 | Stolz et al. | |
| 5,845,481 A | 12/1998 | Briesch et al. | |
| 6,212,871 B1 | 4/2001 | Rakhmailov | |
| 6,405,521 B1 | 6/2002 | Ranasinghe et al. | |
| 6,457,442 B1 * | 10/2002 | Fuchs | F01P 3/20 123/41.29 |
| 6,481,212 B2 | 11/2002 | Priestley | |
| 6,499,303 B1 | 12/2002 | Polukort et al. | |
| 7,536,998 B2 * | 5/2009 | Held | F01P 7/165 123/542 |
| 8,616,005 B1 | 12/2013 | Cousino, Sr. | |
| 2001/0000091 A1 | 4/2001 | Nakhamkin et al. | |
| 2005/0067330 A1 | 3/2005 | Berlin | |
| 2009/0133400 A1 | 5/2009 | Callas | |
| 2009/0200805 A1 | 8/2009 | Kim et al. | |
| 2011/0005228 A1 | 1/2011 | Yoshinari et al. | |
| 2011/0036066 A1 | 2/2011 | Zhang et al. | |
| 2011/0181050 A1 | 7/2011 | Dinu | |
| 2013/0068202 A1 * | 3/2013 | Kardos | F01P 3/20 123/563 |
| 2013/0125525 A1 | 5/2013 | Hein et al. | |
| 2013/0305708 A1 * | 11/2013 | Zahdeh | F01P 3/20 60/599 |
| 2014/0321967 A1 | 10/2014 | Zhang et al. | |

FOREIGN PATENT DOCUMENTS

| | | |
|---|---|---|
| WO | WO-2013116185 A1 * | 8/2013 |
| WO | 2014/066276 A2 | 5/2014 |

* cited by examiner

GAS TURBINE EFFICIENCY AND REGULATION SPEED IMPROVEMENTS USING SUPPLEMENTARY AIR SYSTEM CONTINUOUS AND STORAGE SYSTEMS AND METHODS OF USING THE SAME

CROSS-REFERENCE TO RELATED APPLICATIONS

This application is a divisional of U.S. patent application Ser. No. 14/329,340, filed Jul. 11, 2014, which is a continuation-in-part of U.S. patent application Ser. No. 14/350,469, filed Apr. 8, 2014, now U.S. Pat. No. 9,695,749, which is a National Stage Application of International Patent Application No. PCT/US2013/034748, filed Mar. 31, 2013, which claims priority to U.S. Provisional Patent Application Ser. No. 61/686,222, filed Apr. 2, 2012. The entire disclosure of each of these applications is incorporated by reference herein.

TECHNICAL FIELD

The invention relates generally to gas turbine engine power systems, including supplementing the generating capacity of such gas turbine engines, as well as to energy storage for use in providing additional electrical power during periods of peak electrical power demand. More specifically, a series of improvements to the supplemental generating system are identified.

BACKGROUND OF THE INVENTION

Currently, marginal energy, or peak energy, is produced mainly by gas turbines, operating either in simple cycle or combined cycle configurations. As a result of load demand profile, the gas turbine base systems are cycled up during periods of high demand and cycled down, or turned off, during periods of low demand. This cycling is typically driven by the electrical grid operator under a program called "active grid control", or AGC. Unfortunately, because industrial gas turbines, which represent the majority of the installed power generation base, were designed primarily for base load operation, a severe penalty is associated with the maintenance cost of that particular unit when they are cycled. For example, a gas turbine that is running base load might go through a normal maintenance cycle once every three years, or 24,000 hours of operation, at a cost of between two million dollars and three million dollars ($2,000,000 to $3,000,000). That same cost could be incurred in one year for a gas turbine that is forced to start up and shut down every day due to the severe penalty associated with the maintenance cost of cycling that particular gas turbine. Also, even aero-derivative engines, which are designed for quick starting capability, may still take ten (10) minutes or longer to deliver the required power when called on. This need to cycle the gas turbine fleet is a major issue, and is becoming more problematic with the increased use of intermittent renewable energy sources on the grid.

Currently the gas turbine engines used at power plants can turn down to approximately 50% of their rated capacity. They do this by closing the inlet guide vanes of the compressor, which reduces the air flow to the gas turbine and in turn reduces fuel flow, as a constant fuel air ratio is desired in the combustion process at all engine operating conditions. The goal of maintaining safe compressor operation and gas turbine exhaust emissions typically limit the level of turn down that can be practically achieved.

One way to safely lower the operating limit of the compressor in current gas turbines is by introducing warm air to the inlet of the gas turbine, typically extracted from a mid-stage bleed port on the compressor. Sometimes, this warm air is introduced into the inlet to prevent icing as well. In either case, when this is done, the work that is done to the air by the compressor is sacrificed in the process for the benefit of being able to operate the compressor safely at a lower air flow, yielding the increased turn down capability. Unfortunately, bleeding air from the compressor has a further negative impact on the efficiency of the overall gas turbine system as the work performed on the air that is bled off is lost. In general, for every 1% of air that is bled off the compressor for this turn down improvement, approximately 2% of the total power output of the gas turbine is lost. Additionally, the combustion system also presents a limit to the system.

The combustion system usually limits the amount that the system can be turned down because as less fuel is added, the flame temperature reduces, increasing the amount of carbon monoxide ("CO") emissions produced. The relationship between flame temperature and CO emissions is exponential with reducing temperature, consequently, as the gas turbine system gets near the turn-down limit, the CO emissions spike up, so it is important to a maintain a healthy margin from this limit. This characteristic limits all gas turbine systems to approximately 50% turn down capability, or, for a 100 MW gas turbine, the minimum power turn-down that can be achieved is about 50%, or 50 MW. As the gas turbine mass flow is turned down, the compressor and turbine efficiency falls off as well, causing an increase in heat rate of the machine. Some operators are faced with this situation every day and as a result, as the load demand falls, gas turbine plants hit its lower operating limit and the gas turbines have to be turned off, which causes the power plant to incur a tremendous maintenance cost penalty.

Another characteristic of a typical gas turbine is that as the ambient temperature increases, the power output goes down proportionately due to the linear effect of the reduced density as the temperature of air increases. Power output can be down by more than 10% from nameplate power rating during hot days, which is typically when peaking gas turbines are called on most frequently to deliver power.

Another characteristic of typical gas turbines is that air that is compressed and heated in the compressor section of the gas turbine is ducted to different portions of the gas turbine's turbine section where it is used to cool various components. This air is typically called turbine cooling and leakage air (hereinafter "TCLA") a term that is well known in the art with respect to gas turbines. Although heated from the compression process, TCLA air is still significantly cooler than the turbine temperatures, and thus is effective in cooling those components in the turbine downstream of the compressor. Typically 10% to 15% of the air that enters the inlet of the compressor bypasses the combustor and is used for this process. Thus, TCLA is a significant penalty to the performance of the gas turbine system.

Other power augmentation systems, like inlet chilling for example, provide cooler inlet conditions, resulting in increased air flow through the gas turbine compressor, and the gas turbine output increases proportionately. For example, if inlet chilling reduces the inlet conditions on a hot day such that the gas turbine compressor has 5% more air flow, the output of the gas turbine will also increase by 5%. As ambient temperatures drops, inlet chilling becomes less effective, since the air is already cold. Therefore, inlet chilling power increase is maximized on hot days, and tapers off to zero at approximately 45° F. ambient temperature days.

In power augmentation systems such as the one discussed in U.S. Pat. No. 6,305,158 to Nakhamkin (the "'158 patent"), there are three basic modes of operation defined, a normal mode, charging mode, and an air injection mode, but it is limited by the need for an electrical generator that has the capacity to deliver power "exceeding the full rated power" that the gas turbine system can deliver. The fact that this patent has been issued for more than ten (10) years and yet there are no known applications of it at a time of rapidly rising energy costs is proof that it does not address the market requirements. First of all, it is very expensive to replace and upgrade the electrical generator so it can deliver power "exceeding the full rated power" that the gas turbine system can currently deliver. Also, although the injection option as disclosed in the '158 patent provides power augmentation, it takes a significant amount of time to start and get on line to the electrical grid. This makes application of the '158 patent impractical in certain markets like spinning reserve, where the power increase must occur in a matter of seconds, and due to do the need for the large auxiliary compressor in these types of systems, that takes too long to start.

Another drawback is that the system cannot be implemented on a combined cycle plant without significant negative impact on fuel consumption and therefore efficiency. Most of the implementations outlined in the '158 patent use a recuperator to heat the air in simple cycle operation, which mitigates the fuel consumption increase issue, however, it adds significant cost and complexity. The proposed invention outlined below addresses both the cost and performance shortfalls of the invention disclosed in the '158 patent.

Also, as outlined in a related U.S. Pat. No. 5,934,063 to Nakhamkin (the "'063 patent"), there is a valve structure that "selectively permits one of the following modes of operation: there is a gas turbine normal operation mode, a mode where air is delivered from the storage system and mixed with air in the gas turbine, and then a charging mode". The '063 patent has also been issued for more than ten (10) years and there are also no known applications of it anywhere in the world. The reason for this is again cost and performance shortfalls, similar to those related to the '158 patent. Although this system can be applied without an efficiency penalty on a simple cycle gas turbine, simple cycle gas turbines do not run very often so they typically do not pay off the capital investment in a timeframe that makes the technology attractive to power plant operators. Likewise, if this system is applied to a combined cycle gas turbine, there is a significant heat rate penalty, and again the technology does not address the market needs. The proposed invention outlined below addresses both the cost and performance issues of the '063 patent.

Gas Turbine (GT) power plants provide a significant amount of power to the grid and are used for both base load capacity and regulation on the grid. Because of fluctuating electrical load demand and fluctuations in renewable energy supply, the GT power plants are required to change load frequently. Typically, the grid operator, who is monitoring the demand, supply and frequency of the grid, sends a signal to the gas turbine fleet on a plant-by-plant basis, to supply more or less power to make the supply meet the demand and hold frequency at 50 or 60 hz. This signal is called an Active Grid Control (AGC) signal.

FIG. 9A shows the typical load on the Midwest Iso Grid. As it can be seen in FIG. 9A, there is a minimum load of about 48,000 MegaWatts (MW) required between 2 am and 4 am, and there is an increase in demand during the morning, typically between 4:00 am and 10:00 am, as people and businesses start using more power. Accordingly, an 18,000 MW increase over 6 hours, or 50 MW per minute ramp rate is needed. According to FIG. 9A, the real time ramp rate can be much higher over short periods of time. By 10 am, the grid power is increased to about 66,000 MW and holds at that level until about 5 pm, then power demand decreases due, for example, to some businesses closing. However, there is another peak demand around 8 pm coinciding with when people arrive home and use more power from home. FIG. 9B is an output versus efficiency chart of a typical gas turbine combined cycle plant. At night many plants are shut off or turned down to minimum load due to a drop in demand. A GT's efficiency is at its lowest point at minimum load and generally increases as load increases, or about 3%, which for a F-Class gas turbine is about 200 BTU/kWh. This represents $1,600 worth of wasted fuel assuming $4/MMBTU fuel cost over an 8 hour period for a single 2×1 combined cycle F-class GT power plant (gas turbine engine and steam turbine coupled to the generator). If all 18,000 MW increase described above were from plants as described above (going from minimum load to full load), it would take seventy-two 2×1 combined cycle (CC) GT plants to go from 250 MW to 500 MW and represent $115,000 worth of wasted fuel in order to meet increasing load demands. This quantity of 2×1 GT power plants represents 36,000 MW at full load, or just a little more than half of the total 66,000 MW load based on the fact that about 40% of the installed generation in the United States is GT's. For the United States grid described above, the 66,000 MW (66 GW) represents about 16%, or one sixth of the 400 GW total US electrical demand on the grid that is supplied by GTs. Therefore, approximately $700,000 in fuel cost is wasted every day across the United States or $250,000,000 ($250 M) in one year in order to support load fluctuations on the entire grid. This is a growing challenge as renewable energy sources are becoming a bigger part of the generation and their availability can fluctuate as well.

As one skilled in the art understands, as the ramp rate of the generating asset is improved, less regulation in total is required. To support this ability to support load fluctuations, some of the grid operators pay a higher rate for the same capacity if it is able to respond faster to changing demand.

SUMMARY

The current invention, which may be referred to herein as TurboPHASE™, provides several options, depending on specific plant needs, to improve the efficiency and power output of a plant at low loads, and to reduce the lower limit of power output capability of a gas turbine while at the same time increasing the upper limit of the power output of the gas turbine, thus increasing the capacity and regulation capability of a new or existing gas turbine system.

One aspect of the present invention relates to methods and systems that allow running gas turbine systems to provide additional power quickly during periods of peak demand.

Another aspect of the present invention relates to an energy storage and retrieval system for obtaining useful work from an existing source of a gas turbine power plant.

Yet another aspect of the present invention relates to methods and systems that allow gas turbine systems to be more efficiently turned down during periods of lowered demand.

One embodiment of the invention relates to a system comprising at least one existing gas turbine that comprises one first compressor, at least one electrical generator, at least one turbine connected to the generator and the compressor, a combustor, and a combustion case (which is the discharge manifold for the compressor) and further comprising a supplemental compressor which is not the same as the first compressor.

An advantage of other preferred embodiments of the present invention is the ability to increase the turn down capability of the gas turbine system during periods of lower demand and improve the efficiency and output of the gas turbine system during periods of high demand.

Another advantage of embodiments of the present invention is the ability to increase the turn down capability of the gas turbine system during periods of low demand by using a supplemental compressor driven by a fueled engine, operation of which is which is independent of the electric grid.

Another advantage of embodiments of the present invention is the ability to increase the turn down capability of the gas turbine system during periods of low demand by using a supplemental compressor driven by a fueled engine which produces heat that can be added to compressed air flowing to the combustion case, from either the supplemental compressor, an air storage system, or both, or such heat can be added to the steam cycle in a combined cycle power plant.

Another advantage of some embodiments of the present invention is the ability to increase output of the gas turbine system during periods of high demand by using a supplemental compressor which is not driven by power produced by the gas turbine system.

Another advantage of some embodiments of the present invention is the ability to increase output of the gas turbine system during periods of high demand by using a supplemental compressor which is driven by steam produced by the heat recovery steam generator of a combined cycle power plant.

Another advantage of the present invention is the ability to incorporate selective portions of the embodiments on existing gas turbines to achieve specific plant objectives.

Another advantage of an embodiment of the present invention is the ability to inject compressed air into a turbine cooling circuit without heating up the air prior to such injection, and because cool cooling air can achieve the same desired metal temperatures with use of less compressed air (as compared to heated compressed air), efficiency is improved.

Another advantage of another embodiment of the present invention is that because the incremental amount of compressed air can be added at a relatively constant rate over a wide range of ambient temperatures, the power increase achieved by the gas turbine is also relatively constant over a wide range of ambient temperatures. Additionally, since the supplemental compressed air is delivered without any significant power increase from the gas turbine's compressor, (because the compressed air is from either a separately fueled compressor or an a compressed air storage system), for every 1% of air injected (by mass flow), a 2% power increase results. This is significant because other technologies, such as inlet chillers, for supplementing power yield closer to a 1% power increase for each 1% increase of injected air, therefore, twice as much power boost is achieved with the same incremental air flow through the turbine and combustor, resulting in a physically smaller, and lower cost, power supplementing system.

One preferred embodiment of the present invention includes an intercooled compression circuit using a supplemental compressor to produce compressed air that is stored in one or more high pressure air storage tanks, wherein the intercooling process heat absorbed from the compressed air during compression is transferred to the steam cycle of a combined cycle power plant.

Optionally, when integrated with a combined cycle gas turbine plant with a steam cycle, steam from the steam cycle can be used to drive a secondary steam turbine which in turn drives a supplemental compressor. The use of high pressure air storage tanks in conjunction with firing this air directly in the gas turbine gives the gas turbine the ability to deliver much more power than could be otherwise produced, because the maximum mass flow of air that is currently delivered by the gas turbine system's compressor to the turbine is supplemented with the air from the air tanks. On existing gas turbines, this can increase the output of a gas turbine system up to the current generator limit on a hot day, which could be as much as an additional 20% power output, while at the same time increasing the turn down capability by 25-30% more than current state of the art.

On new gas turbines, the generator and turbine can be oversized to deliver this additional power at any time, thus increasing the name plate power rating of the system by 20% at a total system cost increase that is much lower than 20%, with 25-30% more turn down capability than the current state of the art.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

A gas turbine power augmentation system (TPM) has been developed to increase the power of a gas turbine by adding air back into the gas turbine cycle with a compression process that is very quick to respond to load changes and is more efficient than the gas turbine itself.

The system of the present invention is powered by a fueled engine, such as a natural gas reciprocating engine. In one embodiment, both a reciprocating engine and gas turbine engine burning natural gas are at the same site. Fuel input for a gas turbine engine is at a relatively high pressure, typically between 300 and 500 psi and is at a temperature of approximately 80 deg. F. On the other hand, natural gas input for the reciprocating engine is at approximately 5 psi and a temperature of approximately 80 deg. F. One challenge is to maintain a liquid free gas while dropping the gas pressure to the reciprocating engine two orders of magnitude. A conventional approach is to use a heated pressure regulator, which is typically powered with electricity, which nets out power that could otherwise be output from the plant. An improved way to accomplish this is described below as part of the present invention. Multiple benefits are realized when this is done, including eliminating the electrical heating load as well as reducing the temperature in the intercooler coolant, which improves the efficiency of the intercooled compression process. By using the intercooler coolant to heat the fuel, an efficiency improvement is gained.

The present invention takes air from the atmosphere, pressurizes the air through a separate compressor, and injects the air into the GT engine. This presents a unique opportunity to bleed air from the gas turbine engine prior to starting up the TPM in order to heat up the air injection lines and TPM system. Combining this preheat cycle with the fact that the air is much dryer than the air going through the gas turbine, because of the intercooled process between stages condenses water out, yields a system that can inject hot air very quickly. Typically the fueled engines used in the TPM system are used for emergency power so they are designed to start in seconds. Combining this fast starting capability with the pipe preheat cycle, which reverses the flow in the air injection pipe prior to or in parallel with startup, yields an air injection system that can add significant power to the grid, up to 20% more power from the gas turbine engine, in a matter of seconds. This response speed will allow the grid to operate much more efficiently. Additionally, for plants that have steam injection systems, the same air injection pre-heat system can be used to accelerate the speed that steam injection can be added and taken away from a gas turbine.

Another efficiency improvement can be made while solving a common part load issue that some gas turbine engines experience. On some gas turbine engines equipped with dry low NOx combustion systems, when the gas turbine engine runs at part load, the exhaust temperature increases above allowable temperatures. A common solution to this problem is to pump cooler air into the gas turbine engine exhaust to effectively dilute the temperature to a lower, more acceptable temperature. Presently, this air is bled from the gas turbine compressor discharge, which causes a severe efficiency penalty by reducing the amount of air available for combustion and to power the turbine. The TPM system is a much more efficient system at pumping air than the gas turbine, therefore when the air is pumped into the GT's exhaust, a significant efficiency improvement can be realized because the air is no longer bled from the compressor discharge. A further improvement occurs because the temperature and pressure of the air for exhaust cooling can be controlled separately from the GT.

Another unique aspect of the present invention is that it can generate water as a by-product of the compressed air injection process. Because of the intercooled compression process, as the air is compressed and then cooled in the intercoolers, water condenses and is forced out of the cooler through a drain by the air pressure. The amount of water generated depends on the relative humidity; however, about one gallon per minute of water nominally is generated in a single TPM. This water can be reintroduced into the compressed air stream that is being sent to the gas turbine engine in the form of steam. The water can be heated and turned into steam by using the waste heat from the TPM. If desired, an additional water source can be introduced in the same manner. Typically when a GT is steam injected, the steam is taken from the bottoming cycle steam cycle, which causes a severe drop in efficiency. By using the waste heat from the TPM to convert the water to steam, not only is the power increased from the GT, but, there is no loss in power from the bottoming cycle. If desired, the water collected from the condensate process can be stored for periods of peak generation needs, so the extra power can be delivered when needed. Also, especially at co-generation plants, where the primary focus is generating steam and power for a particular process, sometimes the steam and power are out of balance and excess steam is available. Because steam injection start up time is 30 to 60 minutes the steam is wasted or used inefficiently. With the TPM reverse flow injection pipe heat up process, the injection pipe, which would normally be used for the TPM air injection, can be kept preheated such that the steam can be added much faster. Additionally, installing a steam injection system to capture short periods of inefficiency may not make economic sense, however, with a TPM air injection system already installed, the steam system can be added at very low cost.

Another unique aspect of the present invention is its ability to be coupled with an air storage system. The air storage system augments the power of a gas turbine engine in a similar way to that described above, however, instead of the air being generated real time, the air is compressed and stored in a tank. When peak power is desired, the air can be released from the tank and heated with the waste heat from the previously-described system. So where the previously-described system provides a continuous power increase, the air storage system provides a short burst of power, typically 30 minutes. A battery system, which could be a conventional battery or a super capacitor, that can be added to the system and serves several roles. First, it can add an extremely fast and short duration of power which makes the systems described herein much more valuable to the electric grid. Second, the battery can be used to start the previously-described system, since it is typically started with a battery system. Third, it can be used to charge the air tank if desired which can further be used to add load to the grid temporarily for regulation purposes or to adjust the state of charge of the battery to optimize the life or regulation capacity of the combined system.

The advantage of the preferred embodiment of these efficiency improvements and response rate improvements is that both new and existing gas turbine power plants will improve the quality of and the value of the power they deliver to the grid.

In an embodiment, a method of cooling a gas fueled engine driven intercooled air compressor comprises providing the intercooled air compressor, a gearbox, and the gas fueled engine. The method includes flowing a liquid coolant from a liquid coolant supply to each of the gearbox and an intercooler of the intercooled air compressor. The method comprises recombining the liquid coolant after the gearbox and the intercooler. The method includes directing the recombined liquid coolant via multiple paths to cool the gas fueled engine. The method comprises recombining the liquid coolant after the liquid coolant has passed through the multiple paths.

In another embodiment, a cooling system comprises at least one intercooler, a gearbox, a fueled engine, and a supply of liquid coolant. The system has a first manifold configured to recombine the liquid coolant after the liquid coolant has been directed to each of the at least one intercooler and the gearbox. The system includes a second manifold configured to recombine the liquid coolant after the liquid coolant has been directed via multiple paths to cool the fueled engine. Each of the second manifold and the multiple paths is downstream of the first manifold.

In another embodiment, a method for cooling an intercooled air compressor comprises flowing a liquid coolant from a liquid coolant supply to each of a gearbox and an intercooler. The method includes recombining the liquid coolant after the gearbox and the intercooler. The method comprises directing the recombined liquid coolant via multiple paths to cool a device. The method includes recombining the liquid coolant after the liquid coolant has passed through the multiple paths.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
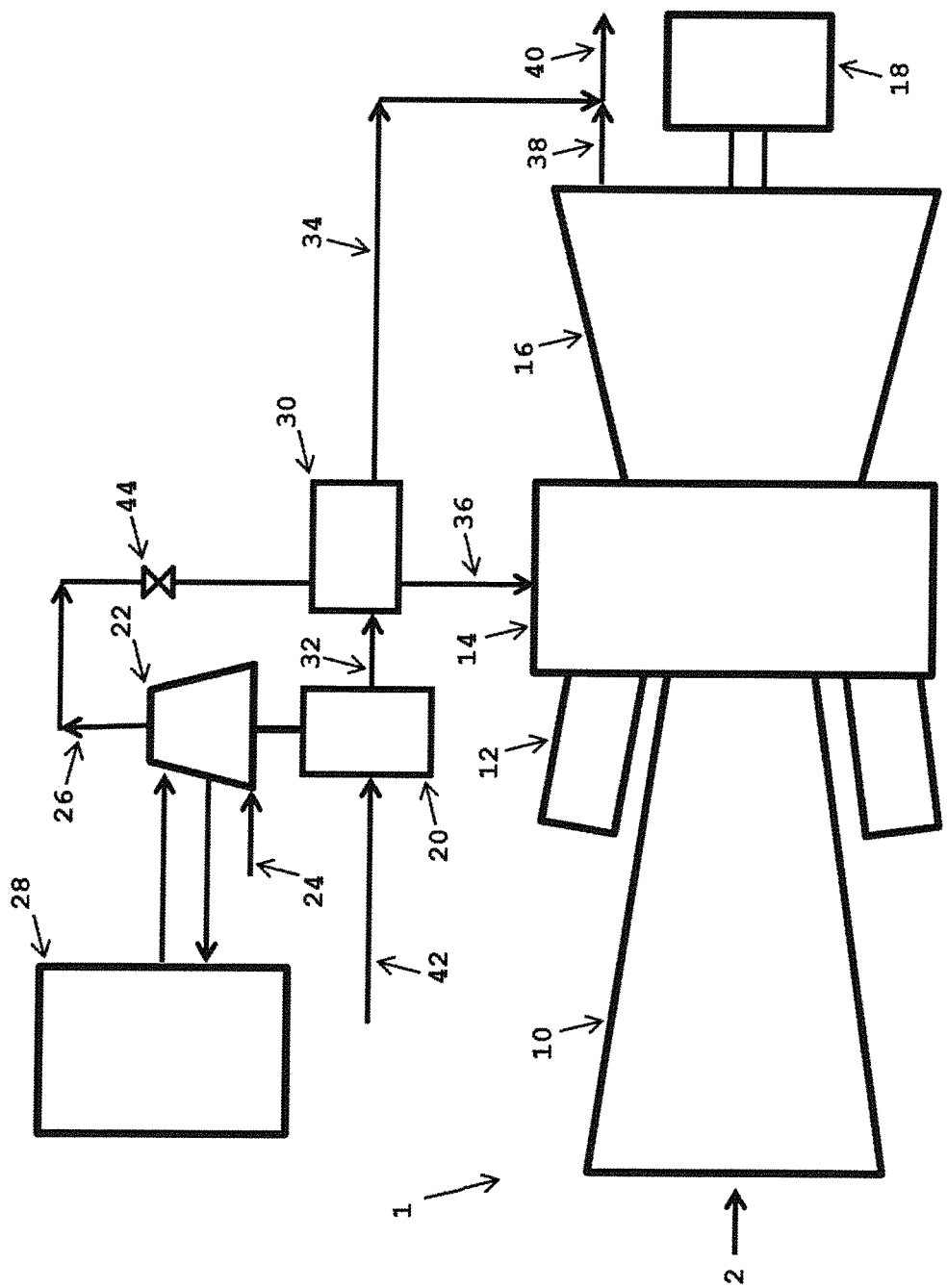
FIG. 1 is a schematic drawing of an embodiment of the present invention having a supplemental energy system with a recuperated engine driving the supplemental compressor.

The components of one embodiment of the present invention are shown in FIG. 1 as they are used with an existing gas turbine system 1. The existing gas turbine system 1, which compresses ambient air 2, includes a compressor 10, combustor 12, combustion case 14, turbine 16 and generator 18. A fueled engine 20 is used to drive a multistage intercooled supplemental compressor 22 which compresses ambient air 24 and discharges compressed air 26. As used herein, the term "fueled engine" means a reciprocating internal combustion engine, a gas turbine (in addition to the gas turbine in the existing gas turbine system 1, or a similar machine that converts fuel into energy through an exothermic reaction such as combustion (e.g., gasoline, diesel, natural gas, or biofuel and similar fuel). The fueled engine draws in ambient air 42 and as a result of the combustion process, produces hot exhaust gas 32. As those skilled in the art will readily appreciate, as air in the supplemental compressor 22 passes from one compressor stage to the next, the air is intercooled by use of an intercooler heat exchanger 28, such as a cooling tower, to reduce the work required to compress the air at the subsequent compressor stage. As used herein, the term "intercooler heat exchanger" means a heat exchanger that receives compressed air from an upstream stage of a compressor, and cools that air before delivering it to another compression stage downstream of the upstream compressor stage. Use of the intercooler heat exchanger 28 increases the efficiency of the supplemental compressor 22, which makes it more efficient than the compressor 10 of the existing gas turbine system 1. As those skilled in the art will readily appreciate, although referred to herein as an "intercooler", the intercooler heat exchanger 28 actually includes an intercooler and an after-cooler as described in greater detail below.

This embodiment further includes a recuperator 30, which is a heat exchanger that receives the exhaust gas 32 from the fueled engine 20 and the compressed air 26 from the supplemental compressor 22. Flow of compressed air from the supplemental compressor 22 to the recuperator 30 is controlled by the recuperator flow control valve 44. Within the recuperator 30, the hot exhaust gas 32 heats the compressed air 26 and then exits the recuperator 30 as substantially cooler exhaust gas 34. At the same time in the recuperator 30, the compressed air 26 absorbs heat from the exhaust gas 32 and then exits the recuperator 30 as substantially hotter compressed air 36 than when it entered the recuperator 30. The substantially hotter compressed air 36 is then discharged from the recuperator 30 into the combustion case 14 of the gas turbine system 1 where it becomes an addition to the mass flow through the turbine 16.

The cooler exhaust gas 34 is then discharged to atmosphere. A selective catalytic reduction ("SCR") device (not shown) of the type known in the art, can be inserted before, in the middle of, or after the recuperator 30 to achieve the most desirable condition for the SCR function. Alternately, after the SCR device, the cooler exhaust gas 34 can be injected into the exhaust gas 38 of the turbine 16 as shown in FIG. 1, and then the mixed flow exhaust 38 will either be discharged to the atmosphere (in the case for the simple cycle gas turbine) or directed to the heat recovery steam generator ("HRSG") of a steam turbine of the type known in the art (not shown) in combined cycle power plants. If the mixed flow exhaust 38 is to be discharged into the HRSG, the means used must ensure that the exhaust gas 38 flow from the turbine 16 into the HRSG and the SCR device is not disrupted. On "F-Class" engines, such as the General Electric Frame 9FA industrial gas turbine, there are large compressor bleed lines that, for starting purposes, bypass air around the turbine section and dump air into the exhaust plenum of the turbine 16. These bleed lines are not in use when the gas turbine system 1 is loaded, and therefore are a good place to discharge the cooler exhaust gas 34 after it exits the recuperator 30, since these compressor bleed lines are already designed to minimize the impact on the HRSG and SCR device. By injecting the exhaust 32 from the fueled engine 20 into to exhaust 38 of the gas turbine system 1, the SCR of the gas turbine system 1 may be used to clean the exhaust 32, thus eliminating an expensive system on the fueled engine 20.

It turns out that gasoline, diesel, natural gas, or biofuel and similar reciprocating engines are not sensitive to back pressure, so putting the recuperator 30, on the fueled engine 20 does not cause a measurable effect on the performance of the fueled engine 20. This is significant because other heat recovery systems, such as the HRSGs used in the exhaust of a typical gas turbine power plants, create a significant power loss all of the time, independent of whether a power augmentation system is in use or not.

The power from the fueled engine 20 is used to drive the intercooled compressor 22. If the installation does include a HSG and a steam turbine, the auxiliary heat from the engine jacket, oil cooler and turbocharger on the fueled engine 20 can be transferred into the steam cycle of the steam turbine via the HSRG (typically the low pressure and temperature condensate line). Likewise, heat removed by the intercooler heat exchanger 28 from the air as it is compressed in the multistage supplemental compressor 22 can be transferred into the steam cycle in a similar manner, prior to the compressed air being cooled by the cooling tower, to lower the temperature of the compressed air to the desired temperature prior to entering the subsequent compression stage of the supplemental compressor 22. If an auxiliary gas turbine is used as the fueled engine 20 instead of a reciprocating engine, lower emission rates will be achievable, which will allow emission permitting even in the strictest environmental areas. Also, if the auxiliary gas turbine is used as the fueled engine 20, the exhaust gas from the auxiliary gas turbine can be piped directly to the exhaust bleed pipes of the existing gas turbine system 1 described above, thus avoiding the cost and maintenance of an additional SCR device.

When peaking with this system, the gas turbine system 1 will most likely be down in power output and flow (assuming that the peaking is needed in the summer when higher ambient air temperatures reduce total mass flow through the gas turbine system 1 which in turn reduces power output of the gas turbine system 1 as a whole, and the supplemental compressor 22 will just bring the air mass flow through the gas turbine system 1 back up to where the flow would have been on a cooler day (i.e. a day on which the full rated power of the gas turbine system 1 could be achieved).

Figure 2:
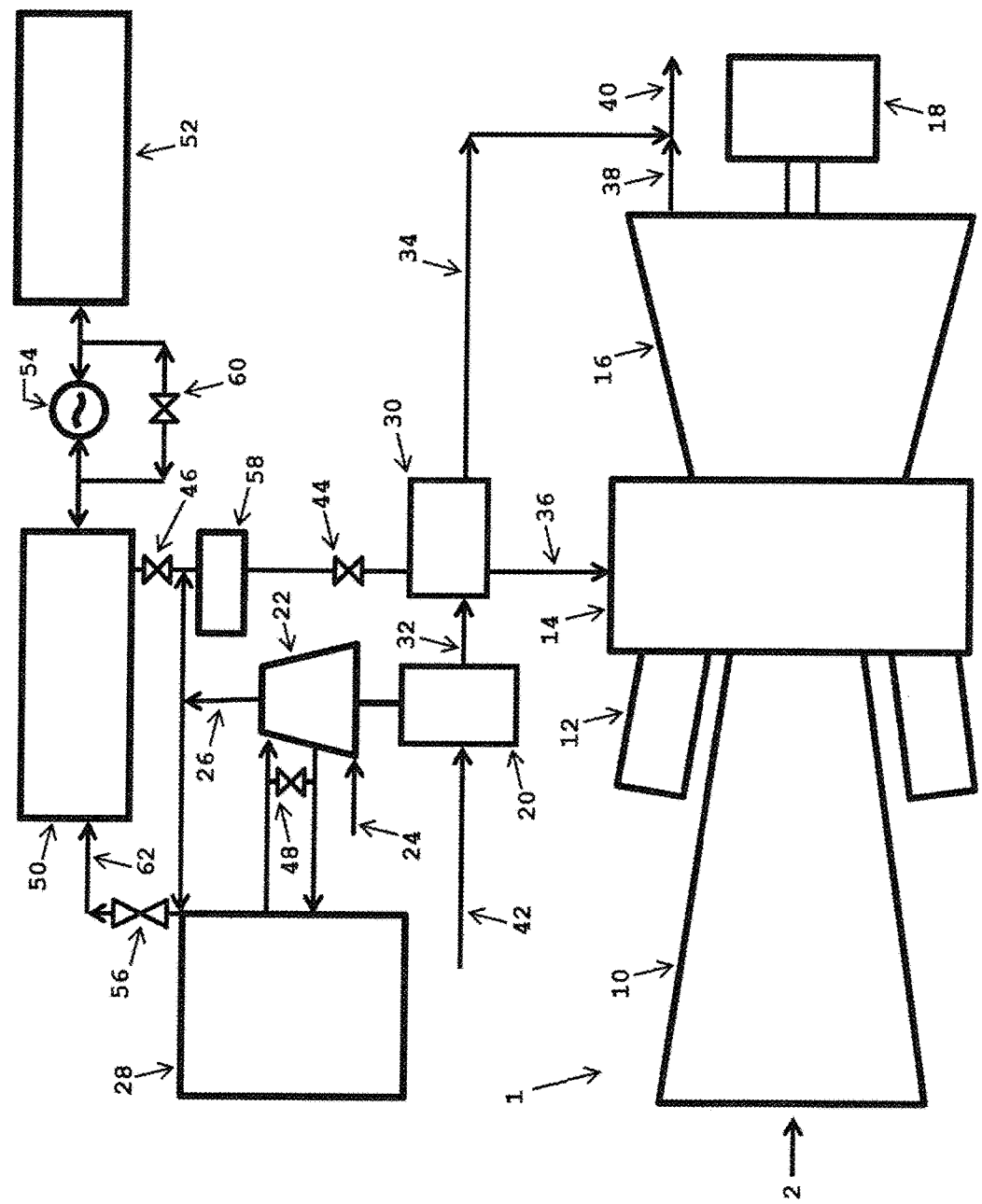
FIG. 2 is a schematic drawing of an embodiment of the present invention having a supplemental energy system with a recuperated engine driving the supplemental compressor and energy storage.

FIG. 2 shows the embodiment of FIG. 1 with the addition of compressed air storage. The compressed air storage system includes an air storage tank 50, a hydraulic fluid tank 52, and a pump 54 for transferring hydraulic fluid, such as water, between the hydraulic fluid tank 52 and the air storage tank 50. According to preferred embodiments, during periods when increased power delivery is needed, the air exit valve 46 opens, the air bypass valve 48 opens, the air inlet valve 56 closes, and the supplemental compressor 22 is operated, driven by the fueled engine 20. As one skilled in the art will readily appreciate, if compressed air is to be stored for later use, it will likely need to be stored at a higher pressure, thus, the supplemental compressor 22 would preferably have additional stages of compression, as compared to the supplemental compressor 22 of the embodiment shown in FIG. 1. These additional stages may be driven by the fueled engine 20 all the time, or may be capable of being driven intermittently by installing a clutch type mechanism that only engages the additional stages when the fueled engine 20 is operated to store compressed air in the air storage tank 50 (where the desired storage pressure is substantially higher to minimize the required volume of the air storage tank 50). Alternatively, the additional stages may be decoupled from the fueled engine 20 and driven by a separately fueled engine (not shown) or other means, such as an electric motor.

The compressed air 26 flowing from the supplemental compressor 22 is forced to flow to the mixer 58 as opposed to towards the intercooler heat exchanger 28 because the air inlet valve 56, which controls air flow exiting the intercooler heat exchanger 28, is closed. The compressed air 26 flowing from the outlet of the supplemental compressor 22 is mixed in the mixer 58 with the compressed air exiting the air storage tank 50 and introduced to the recuperator 30 where it absorbs heat from the exhaust gas of the fueled engine 20 before being introduced into the combustion case 14 using the process described below. As those skilled in the art will readily appreciate, for thermal efficiency purposes, the recuperator 30 would ideally be a counter-flow heat exchanger, since that would allow the maximum amount of heat from the exhaust 32 to be transferred to the compressed air exiting the air storage tank 50. Alternately, if the recuperator 30 is made up of one or more cross-flow heat exchangers, it can have a first stage, which is a first cross-flow heat exchanger, followed by a second stage, which is a second cross-flow heat exchanger. In this configuration, where the exhaust 32 first enters the first stage of the recuperator, is partially cooled, then flows to the second stage of the recuperator. At the same time, the compressed air exiting the air storage tank 50 first enters the second stage of the recuperator 30, where additional heat is extracted from the partially cooled exhaust 32, thereby "pre-heating" the compressed air. The compressed air then flows to the first stage of the recuperator 30 where it is heated by exhaust 32 that has not yet been partially cooled, prior to flowing to the mixer 58 to join the air flowing from the supplemental compressor 22. In this case, the "two stage" recuperator acts more like a counter-flow heat exchanger, yielding higher thermal efficiency in the heating of the compressed air.

As those skilled in the art will readily appreciate, since the air being compressed in the supplemental compressor 22 is bypassing the intercooler heat exchanger 28 due to the bypass valve 48 being open, the compressed air exiting the supplemental compressor 22 retains some of the heat of compression, and when mixed with the compressed air flowing from the air storage tank 50, will increase the temperature of the mixed air so that when the mixed air enters the recuperator 30, it is hotter than it would be if only compressed air from the air storage tank 50 was being fed into the recuperator 30. Likewise, if the air exiting the air storage tank 50 is first preheated in a "second stage" of the recuperator as described above prior to entering the mixer 58, an even hotter mixture of compressed air will result, which may be desirable under some conditions.

As the combustion turbine system 1 continues to be operated in this manner, the pressure of the compressed air in the air storage tank 50 decreases. If the pressure of the compressed air in the air storage tank 50 reaches the pressure of the air in the combustion case 14, compressed air will stop flowing from the air storage tank 50 into the gas turbine system 1. To prevent this from happening, as the pressure of the compressed air in the air storage tank 50 approaches the pressure of the air in the combustion case 14, the fluid control valve 60 remains closed, and the hydraulic pump 54 begins pumping a fluid, such as water, from the hydraulic fluid tank 52 into the air storage tank 50 at a pressure high enough to drive the compressed air therein out of the air storage tank 50, thus allowing essentially all of the compressed air in the air storage tank to be delivered to the combustion case 14.

As those skilled in the art will readily appreciate, if additional compressor stages, or high pressure compressor stages, are added separate from the supplemental compressor 22 driven by the fueled engine 20, then, if desired, air from the gas turbine combustion case 14 can be bled and allowed to flow in reverse of the substantially hotter compressed air 36 as bleed air from the gas turbine combustion case 14 and take the place of air from the separately fueled engine 20 driven supplemental compressor 22. In this case, the bleed air could be cooled in the intercooler heat exchanger 28, or a cooling tower, and then delivered to the inlet of the high pressure stages of the supplemental compressor 22. This may be especially desirable if low turn down capability is desired, as the bleed air results in additional gas turbine power loss, and the drive system for the high pressure stages of the supplemental compressor 22 can driven by an electric motor, consuming electrical power generated by the gas turbine system 1, which also results in additional gas turbine power loss. As those skilled in the art will readily appreciate, this is not an operating mode that would be desirable during periods when supplemental power production from the gas turbine system is desired.

According to preferred embodiments, independent of whether or not the hydraulic system is used, when the air stops flowing from the air storage tank 50, the supplemental compressor 22 can continue to run and deliver power augmentation to the gas turbine system 1. According to other preferred embodiments, such as the one shown in FIG. 1, the supplemental compressor 22 is started and run without use of an air storage tank 50. Preferably, an intercooler heat exchanger 28 is used to cool air from a low pressure stage to a high pressure stage in the supplemental compressor 22 that compresses ambient air 24 through a multistage compressor 22.

The air inlet valve 56, the air outlet valve 46, the bypass valve 48, and the supplemental flow control valve 44, are operated to obtain the desired operating conditions of the gas turbine system 1. For example, if it is desired to charge the air storage tank 50 with compressed air, the air outlet valve 46, the bypass valve 48 and the supplemental flow control valve 44 are closed, the air inlet valve 56 is opened and the fueled engine 20 is used to drive the supplemental compressor 22. As air is compressed in the supplemental compressor 22, it is cooled by the intercooler heat exchanger 28 because the bypass valve 48 is closed, forcing the compressed air to flow through the intercooler heat exchanger 28. Air exiting the supplemental compressor 22 then flows through the air inlet valve 56 and into the air storage tank 50. Likewise, if it is desired to discharge compressed air from the air storage tank 50 and into the combustion case 14 the air outlet valve 46, the bypass valve 48 and the supplemental flow control valve 44 are opened, and the air inlet valve 56 can be closed, and the fueled engine 20 can be used to drive the supplemental compressor 22.

As air is compressed in the supplemental compressor 22, it heats up due to the heat of compression, and it is not cooled in the intercooler heat exchanger because bypass valve 48 is open, thereby bypassing the intercooler heat exchanger. Compressed air from the air storage tank 50 then flows through the mixer 58 where it is mixed with hot air from the supplemental compressor 22 and then flows to the recuperator 30 where it absorbs heat transferred to the recuperator 30 from the exhaust gas 32 of the fueled engine 20 and then flows on to the combustion case 14. In the event that all of the airflow from the supplemental compressor 22 is not needed by the gas turbine system 1, this embodiment can be operated in a hybrid mode where the some of the air flowing from the supplemental compressor 22 flows to the mixer 58 and some of the air flow from the supplemental compressor 22 flows through the intercooler heat exchanger 28 and then through the air inlet valve 56 and into the air storage tank 50.

As those skilled in the art will readily appreciate, the preheated air mixture could be introduced into the combustion turbine at other locations, depending on the desired goal. For example, the preheated air mixture could be introduced into the turbine 16 to cool components therein, thereby reducing or eliminating the need to extract bleed air from the compressor to cool these components. Of course, if this were the intended use of the preheated air mixture, the mixture's desired temperature would be lower, and the mixture ratio in the mixer 58 would need to be changed accordingly, with consideration as to how much heat, if any, is to be added to the preheated air mixture by the recuperator 30 prior to introducing the compressed air mixture into the cooling circuit(s) of the turbine 16. Note that for this intended use, the preheated air mixture could be introduced into the turbine 16 at the same temperature at which the cooling air from the compressor 10 is typically introduced into the TCLA system of the turbine 16, or at a cooler temperature to enhance overall combustion turbine efficiency (since less TCLA cooling air would be required to cool the turbine components).

It is to be understood that when the air storage tank 50 has hydraulic fluid in it prior to the beginning of a charging cycle to add compressed air to the air storage tank 50, the fluid control valve 60 is opened so that as compressed air flows into the air storage tank 50 it drives the hydraulic fluid therein out of the air storage tank 50, through the fluid control valve 60, and back into the hydraulic fluid tank 52. By controlling the pressure and temperature of the air entering the turbine system 1, the gas turbine system's turbine 16 can be operated at increased power because the mass flow of the gas turbine system 1 is effectively increased, which among other things, allows for increased fuel flow into the gas turbine's combustor 12. This increase in fuel flow is similar to the increase in fuel flow associated with cold day operation of the gas turbine system 1 where an increased mass flow through the entire gas turbine system 1 occurs because the ambient air density is greater than it is on a warmer (normal) day.

During periods of higher energy demand, the air flowing from the air storage tank 50 and supplemental compressor 22 may be introduced to the gas turbine system 1 in a manner that offsets the need to bleed cooling air from the compressor 10, thereby allowing more of the air compressed in the compressor 10 to flow through the combustor 12 and on to the turbine 16, thereby increasing the net available power of the gas turbine system 1. The output of the gas turbine 16 is very proportional to the mass flow rate through the gas turbine system 1, and the system described above, as compared to the prior art patents, delivers higher flow rate augmentation to the gas turbine 16 with the same air storage volume and the same supplemental compressor size, when the two are used simultaneously to provide compressed air, resulting in a hybrid system that costs much less than the price of prior art systems, while providing comparable levels of power augmentation.

The supplemental compressor 22 increases the pressure of the ambient air 24 through at least one stage of compression, which is then cooled in the intercooler heat exchanger 28, further compressed in a subsequent stage of the supplemental compressor 22, and then after-cooled in the intercooler heat exchanger 28 (where the compressed air exiting the last stage of the supplemental compressor 22 is then after-cooled in the same intercooler heat exchanger 28), and then the cooled, compressed, high pressure air is delivered to the air storage tank 50 via the open air inlet valve 56 and the inlet manifold 62, and is stored in the air storage tank 50.

As the pressurized air flowing through the intercooler heat exchanger 28 is cooled, the heat transferred therefrom can be used to heat water in the H SG to improve the efficiency of the steam turbine. An alternate method to cool the compressed air in the intercooler heat exchanger 28 is to use relatively cool water from the steam cycle (not shown) on a combined cycle plant. In this configuration, the water would flow into the intercooler heat exchanger 28 and pick up the heat that is extracted from the compressed air from the supplemental compressor 22, and the then warmer water would exit the intercooler heat exchanger 28 and flow back to the steam cycle. With this configuration, heat is captured during both the storage cycle described in this paragraph, and the power augmentation cycle described below.

According to preferred embodiments, the air storage tank 50 is above-ground, preferably on a barge, skid, trailer or other mobile platform and is adapted or configured to be easily installed and transported. The additional components, excluding the gas turbine system 1, should add less than 20,000 square feet, preferably less than 15,000 square feet, and most preferably less than 10,000 square feet to the overall footprint of the power plant. A continuous augmentation system of the present invention takes up 1% of the footprint of a combined cycle plant and delivers from three to five times the power per square foot as compared to the rest of the plant, thus it is very space efficient, while a continuous augmentation system of the present invention with storage system takes up 5% of the footprint of the combined cycle plant and delivers from one to two times the power per square foot of the power plant.

Figure 3:
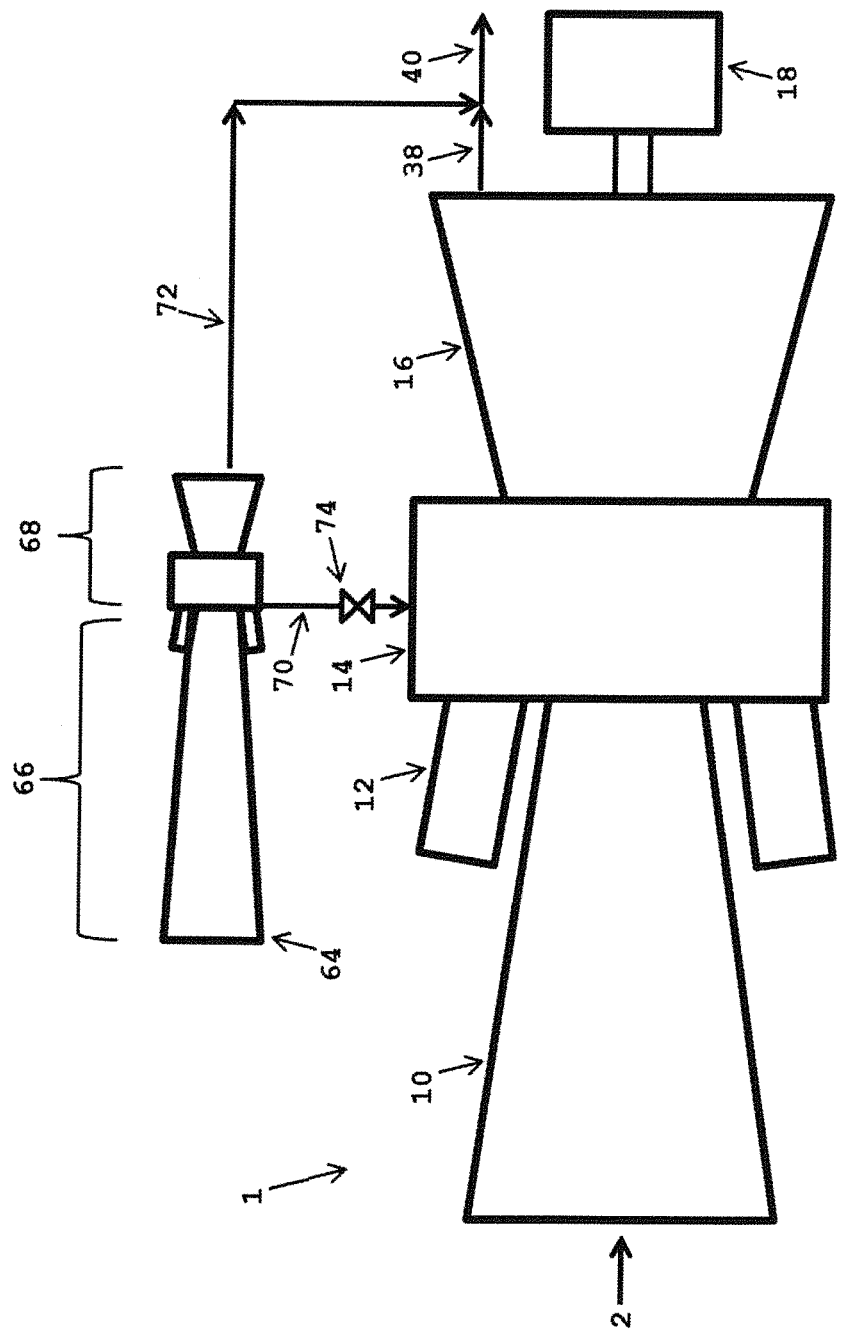
FIG. 3 is a schematic drawing of an embodiment of the present invention incorporating a continuous power augmentation system.

FIG. 3 shows another embodiment of the present invention in which an auxiliary gas turbine 64 is used to provide supplemental air flow at times when additional power output from the gas turbine system 1 is needed. The auxiliary gas turbine 64 includes a supplemental compressor section 66 and a supplemental turbine section 68. In this embodiment, the auxiliary gas turbine is designed so that substantially all of the power produced by the supplemental turbine section 68 is used to drive the supplemental compressor section 66. As used herein the term "substantially all" means that more than 90% of the power produced by the supplemental turbine section 68 is used to drive the supplemental compressor 66, because major accessories, such as the electric generator used with the gas turbine system 1, are not drawing power from the auxiliary gas turbine section 68. Manufacturers of small gas turbines, such as Solar Turbines Inc., have the capability to mix and match compressors and combustors/turbines because they build their systems with multiple bearings to support the supplemental compressor section 66 and the supplemental turbine section 68. A specialized turbine, with an oversized gas turbine compressor 66 and with a regular sized turbine/combustion system 68 is used to provide additional supplemental airflow to the gas turbine system 1, and the excess compressed air 70 output from the oversized compressor 66, which is in excess of what is needed to run the turbine/combustion system 68, flows through the combustion case flow control valve 74, when it is in the open position, and is discharged into the combustion case 14 of the gas turbine system 1 to increase the total mass flow through the turbine 16 of the gas turbine system 1, and therefore increases the total power output by the gas turbine system 1. For example, a 50 lb/sec combustor/turbine section 68 that would normally be rated for 4 MW, may actually be generating 8 MW, but the compressor is drawing 4 MW, so the net output from the generator is 4 MW. If such a turbine were coupled with a 100 lb/sec compressor on it, but only 50 lbs/sec were fed to the combustor/turbine section 68, the other 50 lb/sec could be fed to the combustion case of the gas turbine system 1. The exhaust 72 of the 50 lb/sec combustor/turbine section 68 could be injected into the exhaust 38 of the main turbine 16 similar to the manner described in the embodiment shown in FIG. 1, and jointly sent to the SCR. Optionally, the exhaust can be separately treated, if required.

Obviously, the pressure from the 100 lb/sec compressor 66 has to be sufficient to drive the compressed air output therefrom into the combustion case 14. Fortunately, many of the smaller gas turbine engines are based on derivatives of aircraft engines and have much higher pressure ratios than the large industrial gas turbines used at most power plants. As shown in FIG. 3, this embodiment of the present invention does not include the recuperator 30, the intercooled compressor 22, or the intercooler heat exchanger 28 shown in FIGS. 1 and 2. Of course, the embodiment shown in FIG. 3 does not provide the efficiency improvement of the intercooled embodiments shown in FIGS. 1 and 2, however the initial cost of the embodiment shown in FIG. 3 is substantially less, which may make it an attractive option to operators of power plants that typically provide power in times of peak demand, and that therefore are not run much and are less sensitive to fuel efficiency. When the auxiliary gas turbine 64 is not running, the combustion case flow control valve 74 is closed.

Figure 4:
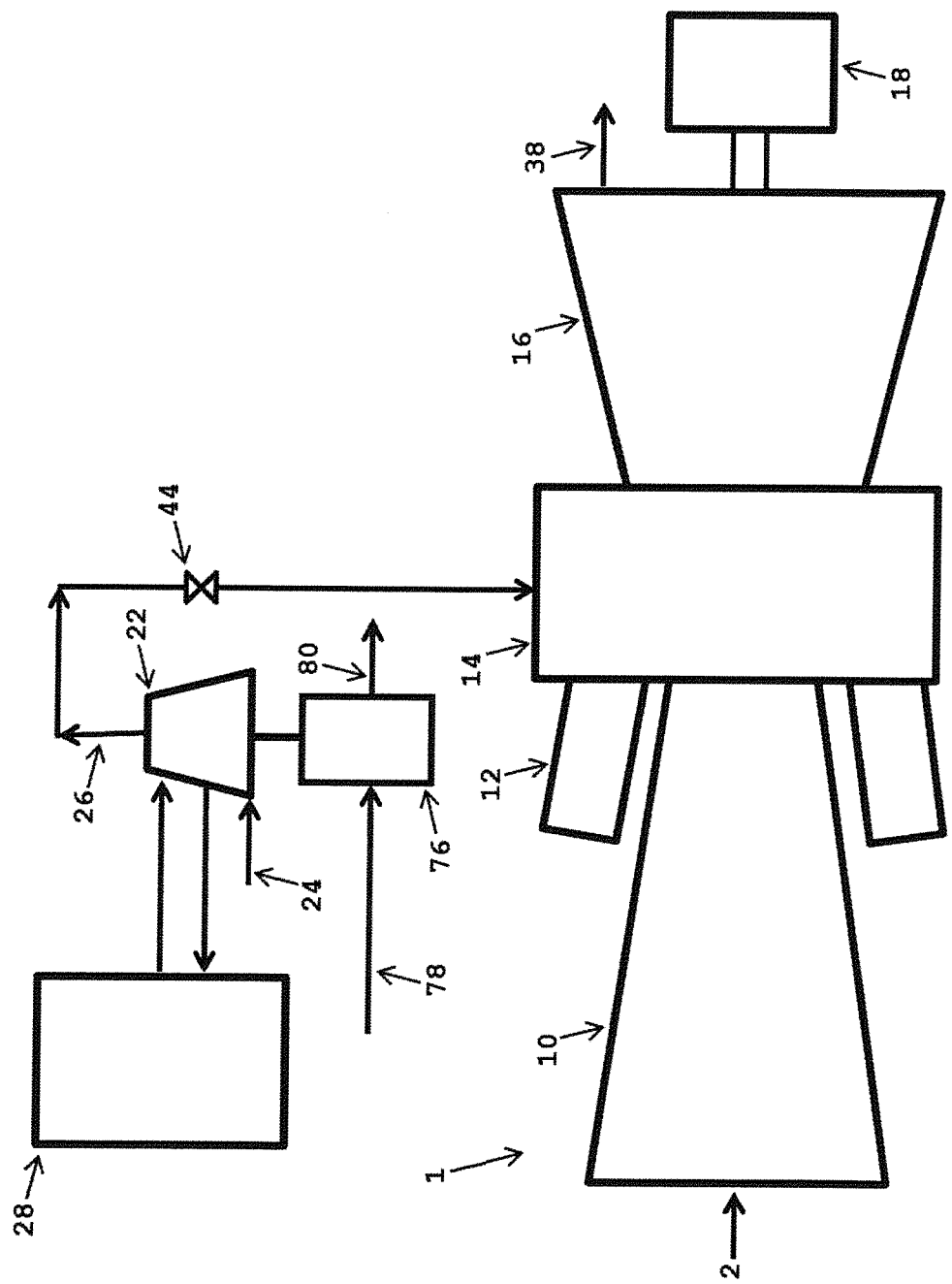
FIG. 4 is a schematic drawing of an embodiment of the present invention in which an auxiliary steam turbine is drives the supplemental compressor.

The embodiment shown in FIG. 4 shows another way to incorporate a supplemental compressor 22 into the gas turbine system 1. In some situations, the gas turbine augmentation of the present invention with (i) the additional mass flow to the HRSG, and/or (ii) the additional heat from the intercooler heat exchanger 28 and fueled engine 20 (as compared to a gas turbine system 1 that does not incorporate the present invention), may be too much for the steam turbine and/or the steam turbine generator to handle if all of the additional heat flows to the steam turbine generator (especially if the power plant has duct burners to replace the missing exhaust energy on hot days). In this case, the additional steam generated as a result of adding the heat of compression generated by the supplemental compressor 22 can be extracted from the steam cycle HRSG. As it happens, when compressed air augmentation is added to the gas turbine system 1, the heat energy extracted from the intercooler heat exchanger 28 generates about the same amount of energy that it takes to drive the supplemental compressor 22. In other words, if you had a steam turbine that generated 100 MW normally and 108 MW when the supplemental compressor 22 was injecting compressed air into the gas turbine system 1, the extra 8 MW is approximately equal to the power requirement to drive the intercooled supplemental compressor 22. Therefore, if some of the steam is extracted from the steam cycle of the power plant, and the steam turbine is kept at 100 MW, a small auxiliary steam turbine 76 can be used to drive the intercooled supplemental compressor 22, and there would be no additional source of emissions at the power plant.

In FIG. 4, an auxiliary steam turbine 76 drives the intercooled supplemental compressor 22 and the steam 78 that is used to drive the steam engine 76, which comes from the HRSG (not shown) of the power plant, is the extra steam produced from the heat, being added to the HRSG, which was extracted by the intercooler heat exchanger 22 during compression of air in the supplemental compressor 22. The exhaust 80 of the steam engine 76 is returned to the HRSG where it is used to produce more steam. This embodiment of the present invention results in a significant efficiency improvement because the compression process of the supplemental compressor 22 is much more efficient than the compressor 10 of the gas turbine system 1. In this situation, the power augmentation level will, of course, be reduced as the steam turbine will not be putting out additional MW, however there will be no other source of emissions/fuel burn.

Figure 5:
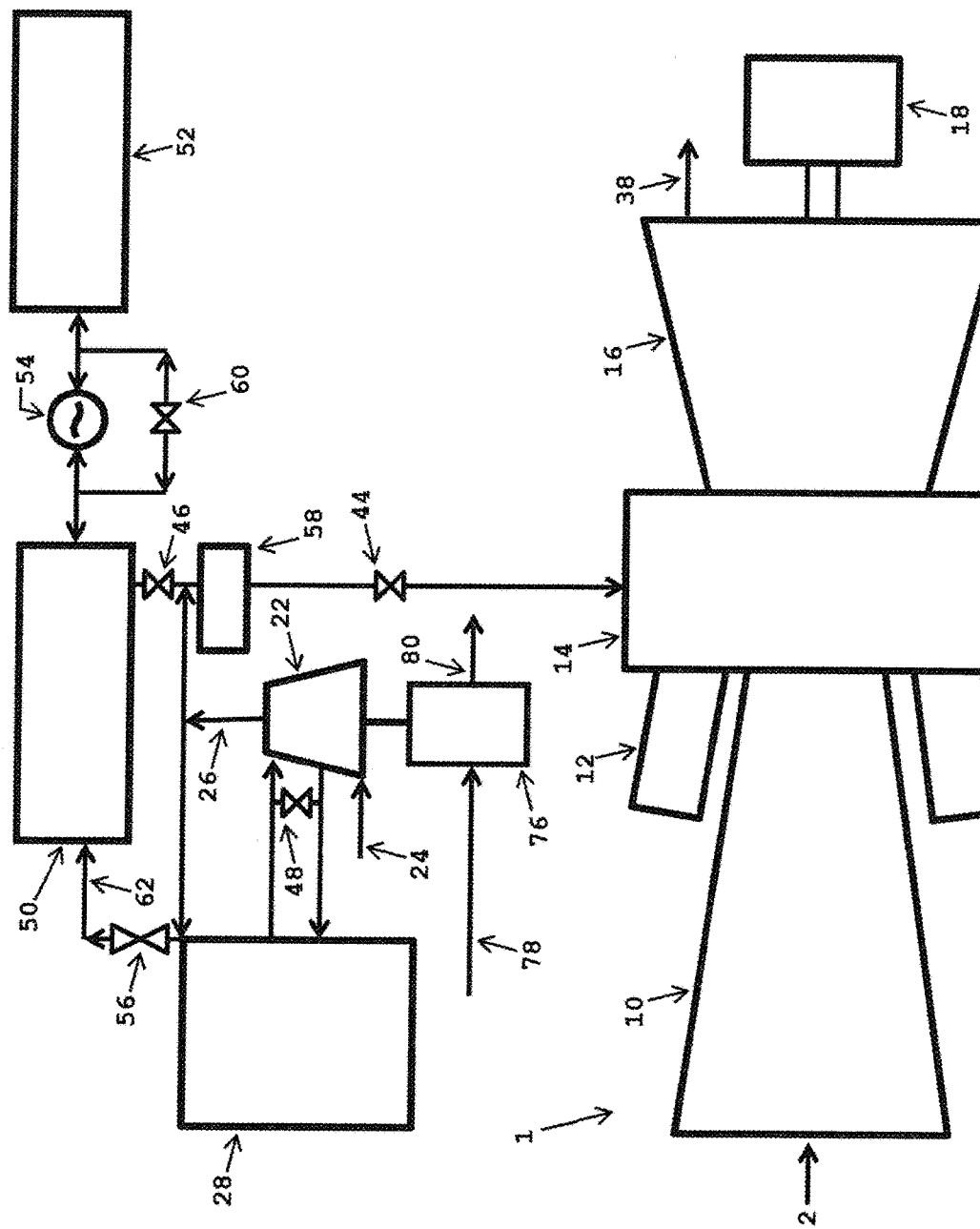
FIG. 5 is a schematic drawing of an embodiment of the present invention in which includes an auxiliary steam turbine driving the supplemental compressor and energy storage.

FIG. 5 shows the embodiment of FIG. 4 with the addition of compressed air storage. This implementation of compressed air energy storage is similar to that described with respect to FIG. 2, as is the operation thereof. As those skilled in the art will readily appreciate, the power augmentation level of the embodiment shown in FIG. 5 is less than the embodiment shown in FIG. 2, since the steam turbine will not be putting out additional MW, however there will be no other source of emissions/fuel burn.

Figure 6:
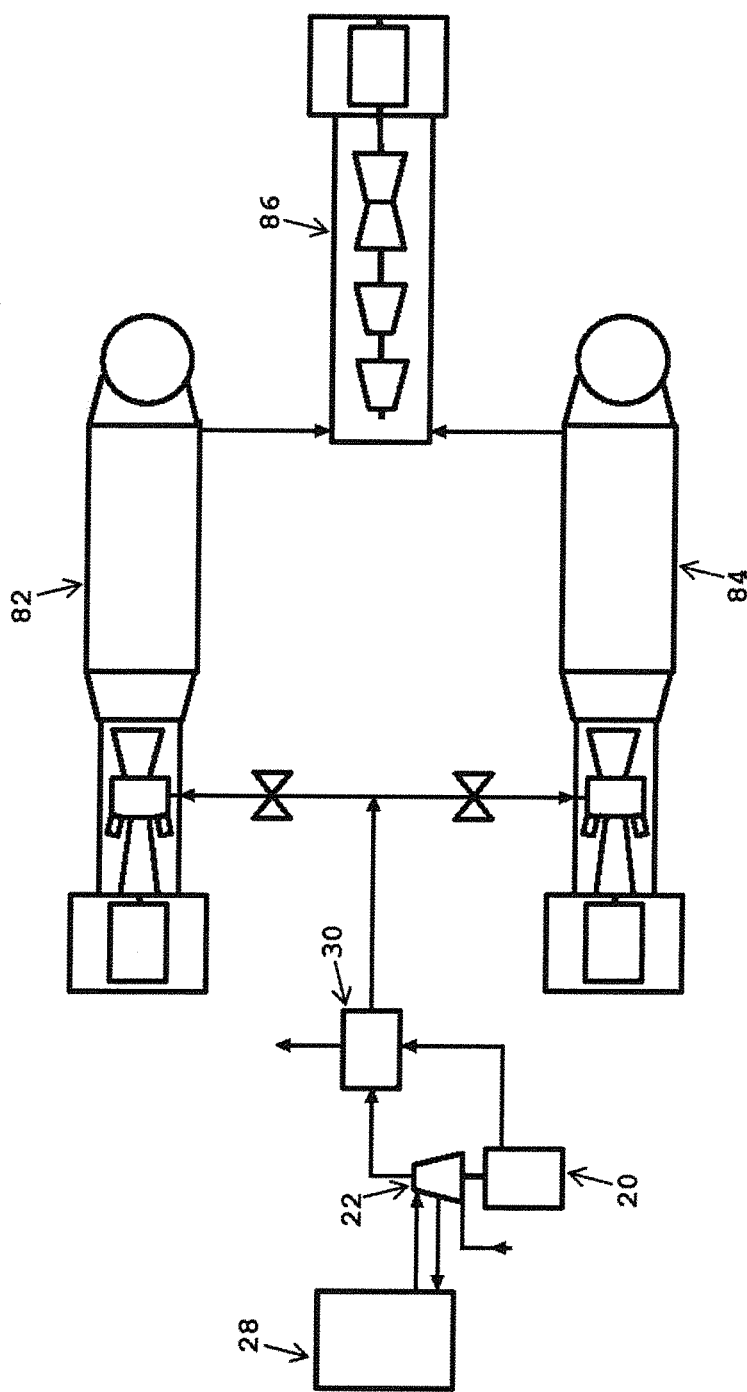
FIG. 6 is a schematic drawing of an embodiment of the present invention installed in conjunction with two gas turbines and a steam turbine.
Figure 7:
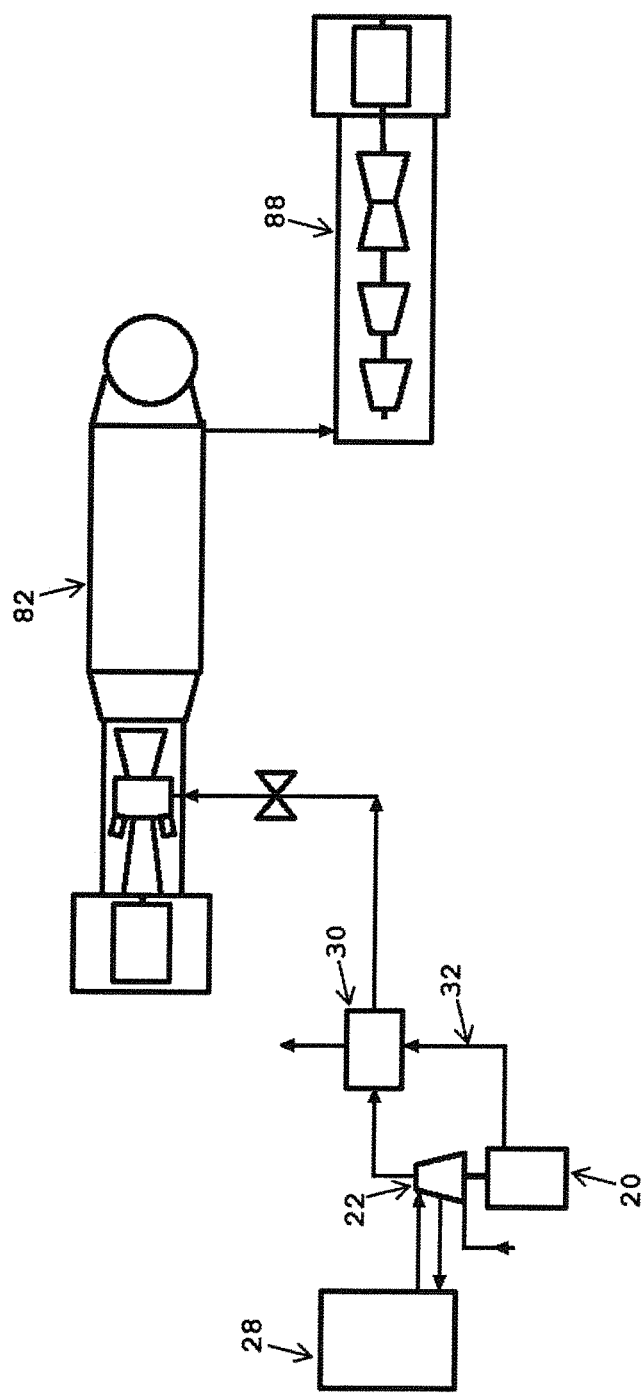
FIG. 7 is a schematic drawing of an embodiment of the present invention installed in conjunction with one gas turbine and a steam turbine.
Figure 8:
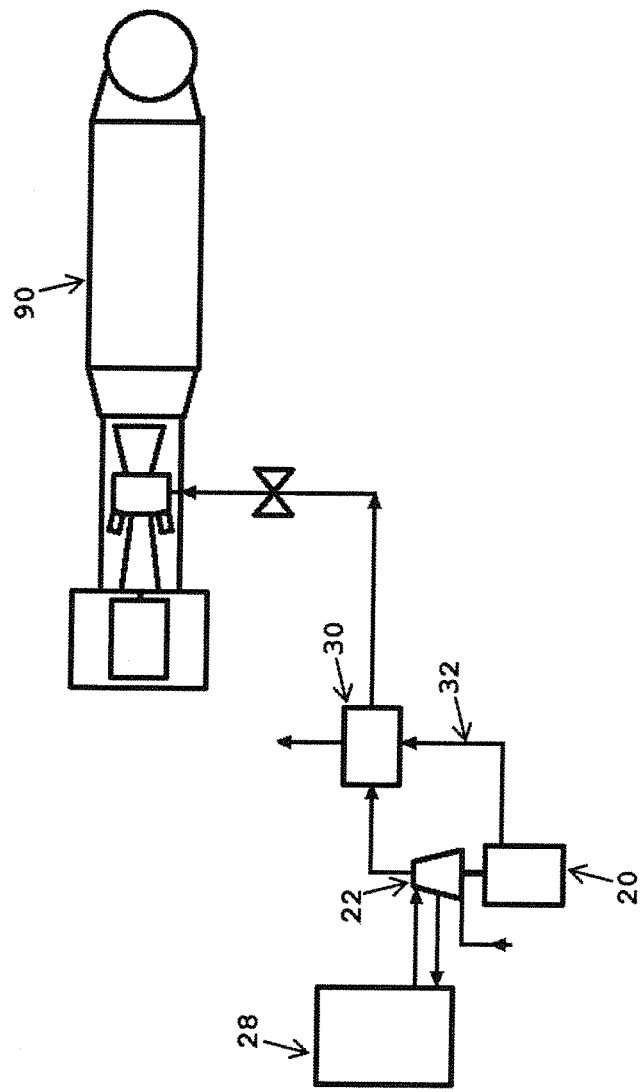
FIG. 8 is a schematic drawing of an embodiment of the present invention installed in conjunction with one gas turbine.

FIGS. 6-8 show various implementations of the embodiment shown in FIG. 1, referred to as the "TurboPHASE system". TurboPHASE, which is a supplemental power system for gas turbine systems, is a modular, packaged "turbocharger" that can be added to most, if not all, gas turbines, and can add up to 20% more output to existing simple cycle and combined cycle plants, while improving efficiency (i.e. "heat rate") by up to 7%. The TurboPHASE system is compatible with all types of inlet chilling or fogging systems, and when properly implemented, will leave emissions rates (e.g. ppm of NOx, CO, etc.) unchanged, while the specific emissions rates should improve as the result of improvement in heat rate. Since only clean air, at the appropriate temperature, is injected into the turbine, the TurboPHASE system has no negative effect on gas turbine maintenance requirements. Due to the factory-assembled & tested modules that make up the TurboPHASE system, installation at an existing power plant is quick, requiring only a few days of the gas turbine system being down for outage to complete connections and to perform commissioning.

FIG. 6 shows an implementation of the embodiment of the present invention shown in FIG. 1 in conjunction with two 135 MW General Electric Frame 9E industrial gas turbines 82, 84 in a combined cycle configuration with a 135 MW steam turbine 86 ("ST"). The results of this implementation are shown below in Table 1.

TABLE 1

| (7.0% additional Flow added to 2 × 1 9E combined cycle on a 59 F. day (+71 lbs/sec per GT)) | | |
|---|---|---|
|  | Existing plant | With TurboPHASE ™ |
| Compressor Pressure ratio | 12.7 | 13.6 |
| Compressor discharge temperature | 673 F. | 760 F. |
| Compressor discharge pressure | 185 psi | 197 psi |
| Turbine Firing temperature | 2035 F. | 2035 F. |
| Turbine exhaust temperature | 1000 F. | 981 F. (−19 F.) |
| 9E GT Output(MW each) | 135 MW (base load each) | +23 MW (+17% output) |
| Increased flow | N/A | +20.7 |
| Increase PR turbine output (delta) | N/A | +5.6 |
| Increase PR compressor load (delta) | N/A | −3.3 |
| ST output (MW) | 135 MW (base load) | +16 MW (+12%) |
| Increased flow | N/A | +9.4 |
| Cooler Exhaust temp | N/A | −2.9 |
| Jacket heat and IC heat put into ST | N/A | +9.9 |
| 9E Plant Output SC (MW) | 135 MW (base load) | 158 MW (+23 MW or +17%) |
| 9E Plant Output CC (MW) | 405 MW (base load) | 467 MW (+62 MW or +15%) |
| Base load Fuel Burn per GT | 1397 MMBTU/hr | 1514 MMBTU/hr |
| Fuelburn of aux engine delivering 71 lbs/sec | N/A | 96 MMBTU/hr (740 Gal/hr ~15,000 HP) |
| Total additional fuel burn of GT | N/A | 11 MMBTU/hr (+1%) |
| Increase flow | N/A | 98 MMBTU/hr (+7%) |
| Increased PR/higher CDT/mixed temp | N/A | −77 MMBTU/hr |
| Total Plant Fuel Burn CC | 2974 MMBTU/hr | 3028 MMBTU/hr |
| Heat rate SC | 10350 BTU/kWh | 9582 BTU/kwh (−767 BTU/kWh or −7%) |
| Heat rate CC | 6900 BTU/kWh | 6483 BTU/kWh (−416 BTU/kWh or −6%) |

As is clear from Table 1, the implementation increased power output from each of the gas turbines by 23 MW, and increased power output from the steam turbine by 6 MW, for a total of 52 MW (2×23 MW+6 MW=52 MW). The TurboPHASE system increases air flow to the gas turbines by 7%, is operable at any ambient temperature, and yields a 4% heat rate improvement. In doing so, the pressure ratio ("PR") at the gas turbine outlet of each gas turbine increased by 5.6, while the PR of the compressor load exhibited a 3.3 decrease. The total fuel consumption rate for the combined cycle ("CC") plant increased by 54 MMBTU/hr while the heat rate for the CC plant decreased by 416 BTU kWh. For informational purposes, Table 1 also shows that if the implementation had been on a simple cycle ("SC") plant, the increased power output from each of the gas turbines by would have totaled 46 MW, while the heat rate would have decreased by 767 BTU/kWh. As an option, the intercooler heat exchanger can be eliminated and the supplemental compressor heat and engine heat added to the steam turbine cycle, which increases ST output from +6 MW to +16 MW (62 MW total) and improves heat rate by 6%.

FIG. 7 shows an implementation of the embodiment shown in FIG. 1 on a CC plant comprising one General Electric Frame 9FA industrial gas turbine 82 and one 138 MW steam turbine. In this implementation, power output by the 9FA industrial gas turbine 82 is increased by 42 MW from 260 MW, and power output by the steam turbine 88 is increased by 8 MW, for a total power output increase of 50 MW, along with a heat rate improvement of 0.25%. As an option, the intercooler heat exchanger 28 can be eliminated and the heat of compression of the supplemental compressor 22 and the heat from the exhaust 32 of the fueled engine can be added to the H SG in the steam cycle, which increases ST output from +8 MW to +14 MW (56 MW total) and improves heat rate to 1.8%.

FIG. 8 shows an implementation of the embodiment shown in FIG. 1 on a SC plant comprising one General Electric Frame 9B (or 9E) industrial gas turbine 90. In this implementation, power output by the 9B is increased by 23 MW from 135 MW, along with a heat rate improvement of 7%.

Implementation of the embodiments of the present invention preferably provide the following benefits: (i) Installation is quick and simple, with no major electric tie-in required; (ii) No change in gas turbine firing temperature, so gas turbine maintenance costs are unchanged; (iii) It uses existing ports on gas turbine system's combustion case to inject air; (iv) High efficiency, recuperated and internal combustion engine-driven inter-cooled supplemental compressor improves both SC and CC heat rates; (v) It is compatible with water injection, fogging, inlet chilling, steam injection, and duct burners; (vi) Air is injected into gas turbine combustion case at compatible temperatures and pressures; (vii) The internal combustion, reciprocating, fueled engine can burn natural gas, low BTU biofuel or diesel (also available with small steam turbine driver and small gas turbine driver for the fueled engine.); and (viii) Energy storage option also available: approximately 2 times the price and 2 times the efficiency improvement.

Figure 10:
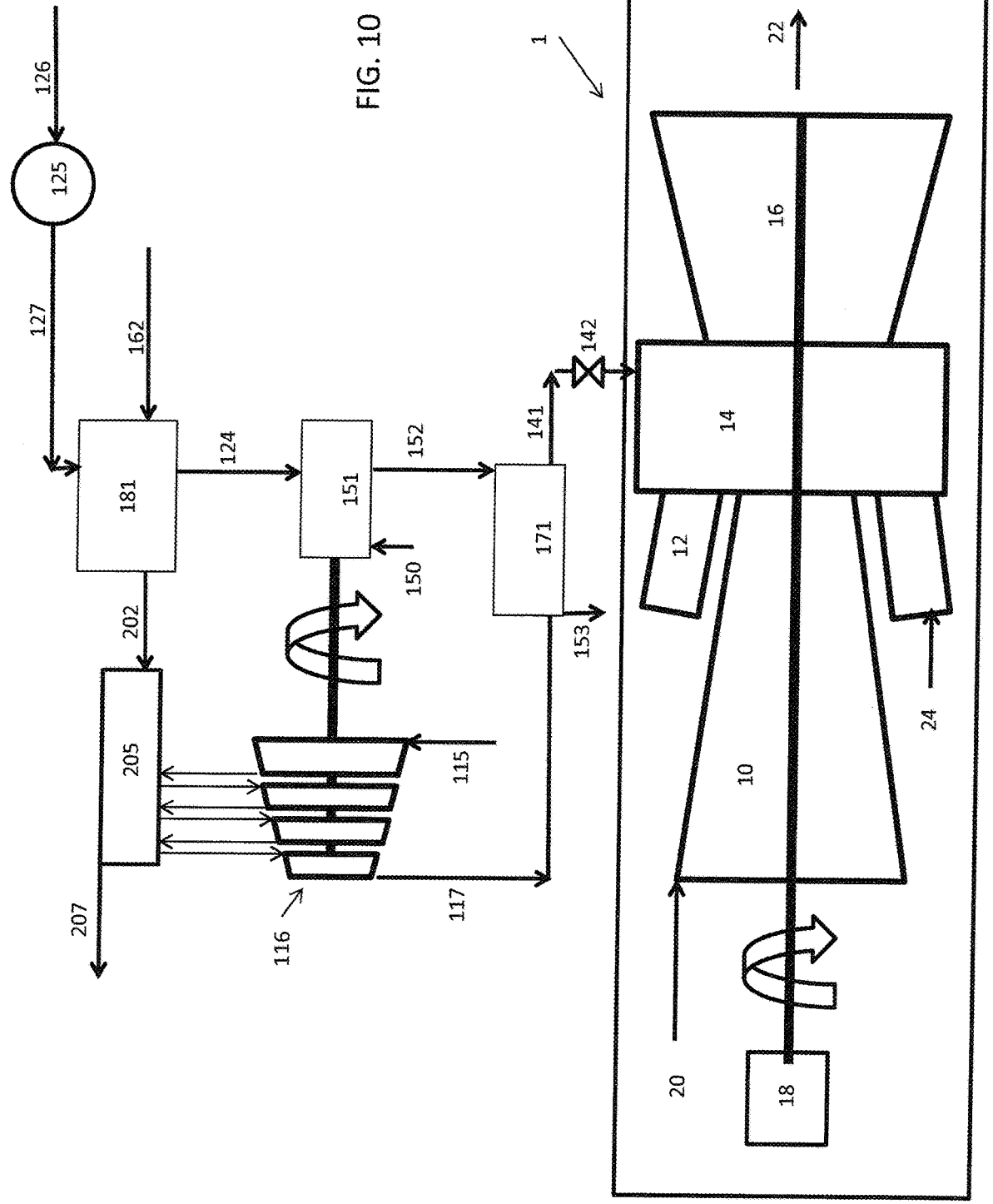
FIG. 10 is a schematic drawing of an embodiment of the present invention having a system delivering power augmentation air to the gas turbine engine while the natural gas fuel supply is cooling the coolant to the system.

Referring now to FIG. 10, one embodiment of the present invention relates to improving the efficiency of the TPM compression process by transferring heat from the TPM coolant to the fuel entering the TPM. A typical gas turbine 1 has an axial compressor 10, a combustion system 12, a compressor discharge plenum 14, a turbine 16 and a generator 18 which is compressing air 20 and adding fuel 24 to react and generate hot gasses 22 passing through the turbine 16 and going out the exhaust of the gas turbine.

The present invention comprises a fueled engine 151 driving an intercooled compressor 116 which takes ambient air 115, compresses air 115, and yields a relatively cool compressed air 117 exiting the intercooled compressor 116. The compressed air 117 is later heated in a recuperator 171, resulting in heated compressed air 141, which is and then injected into the gas turbine engine 1 when the injection control valve 142 is open, where the heat transferred to the air in recuperator 171 comes from the exhaust 152 of a fueled engine 151, which is driving the compressor 116. Warm exhaust 153 exits the recuperator 171 after some of the energy is transferred to the compressed air 117.

The compressor intercooler 205 has coolant 202 entering the coolers which is typically water or water with an additive to keep it from freezing. The coolant temperature is a main component to the efficiency of the intercooled compressor 116. The colder the coolant 202, the more efficient the compression process. A fuel regulator 125 is used to drop the pressure of the pipeline gas 126 several orders of magnitude to near ambient pressure gas 127 which is required for natural gas reciprocating engines, such as the fueled engine 151. When the pressure in the gas is dropped, the temperature is reduced significantly, typically about 10 F for every 100 psi pressure drop. In one aspect of this invention, the coolant 162 for the intercooled compression process 162 is used to heat the natural gas 127 in a fuel heater 181 positioned downstream of the fuel regulator 125. This process also reduces the temperature of coolant 202 entering the intercoolers 205 which results in another efficiency improvement to the system. In prior art systems, an electric heater is provided to heat the fuel. However, electric heaters reduce overall efficiency since they consume power in order to operate.

Figure 11:
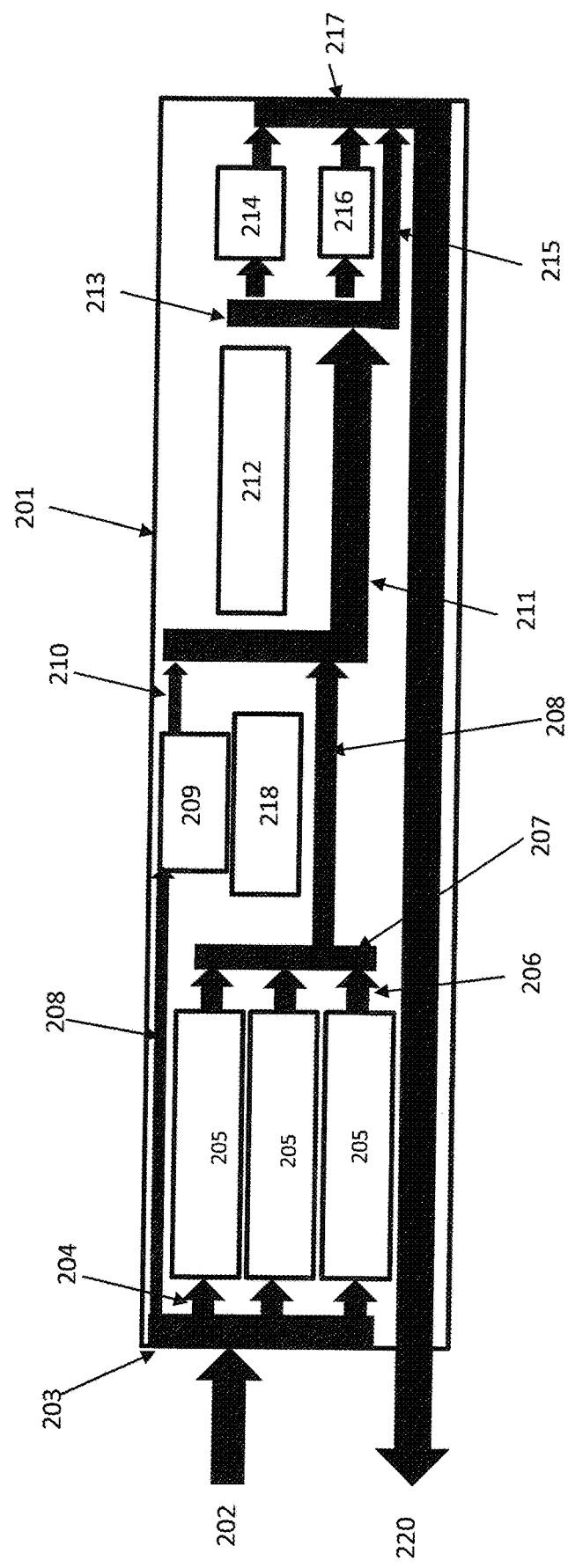
FIG. 11 is a schematic drawing of the cooling system in accordance with an embodiment of the present invention.

Another aspect of the invention relates to the through cooling arrangement of the intercooled compressor. Typically reciprocating engines are cooled with air coolers (radiators), however, since the intercooled compressor requires water coolant, a complete once through package cooling system is much more cost effective and allows for optimized temperature control in the different engine coolant and compressor coolant systems. Referring to FIG. 11, an intercooled compressor 205, gearbox 218, and fueled engine 212 are shown along with a once through coolant system 201. Coolant 202 enters the system 201 and is split four ways, three main paths 204 pass through each of the intercoolers 205 and path 208 for cooler 209 of gearbox 218. It is understood that the number of main paths 204 are not limited to three but instead correspond to the quantity of intercoolers 205 present. The coolant exiting 206 from the intercoolers 205 is then joined together in a manifold 207, which in turn joins together with the coolant 210 exiting the gearbox cooler 209 to form the engine coolant 211 for cooling the fueled engine 212. The engine coolant 211 feeds a manifold 213 that has three separate paths: a high temperature (HT) cooler 214, which typically cools the engine jacket of the fueled engine 212 and acts as the first of two stages of cooling for the turbocharged reciprocating engine air; the low temperature (LT) cooler 216, which is the second stage of cooling on the turbocharged reciprocating engine air, and a bypass 215. Each of these circuits 214, 215, and 216 provides critical cooling function which must be closely controlled to provide optimum engine performance and emissions. After the coolant passes through these three engine related coolers 214 and 216 and bypass 215, the coolant enters an exit manifold 217 and exits the system at outlet 220. Since the system 201 is a "once through" system it captures the maximum amount of heat that the system is releasing which is important for several reasons. First, because it is a single system, the system is simple to install. Second, if the heat is desired to be input into another process, like the bottoming cycle of a combined cycle power plant, then the maximum heat is being captured which will result in the best efficiency.

Figure 12:
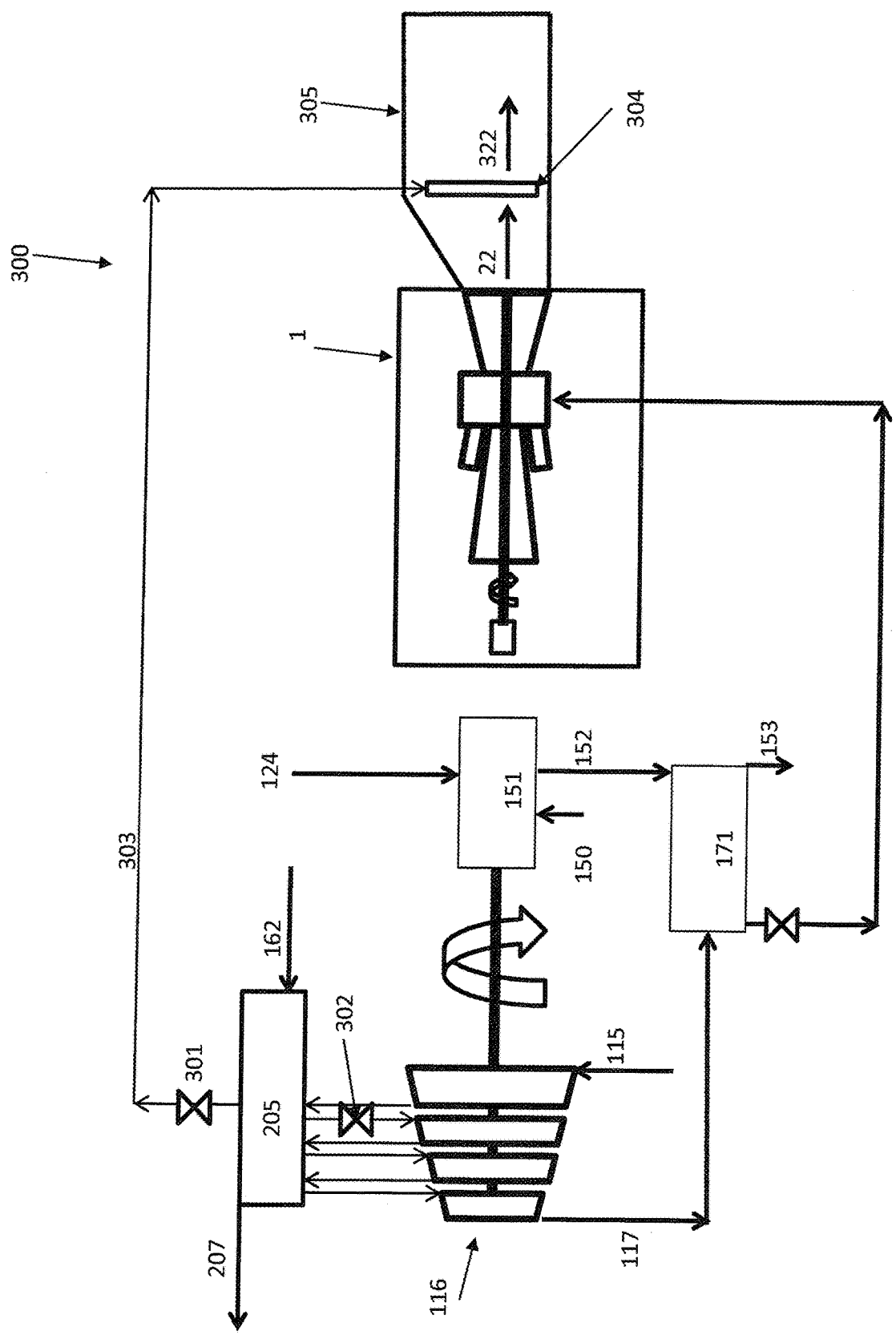
FIG. 12 is a schematic drawing of an embodiment of the present invention capable of delivering power augmentation air to the gas turbine engine and using power augmentation air to cool the exhaust of the gas turbine engine.

Another aspect of the present invention relates to a power augmentation and exhaust cooling system. FIG. 12 shows a combined power augmentation system and exhaust tempering system 300. When maximum power is desired from the GT 1, the power augmentation system discussed above is used. When minimum power is desired, instead of the cooled air 117 exiting the intercooled compressor 116 and being routed to the gas turbine 1, the compressed air is routed to a manifold 304 in the exhaust and is used to reduce the temperature of the GT exhaust 22 to a lower temperature exhaust 322. The manifold 304 can be located inside or outside the heat recovery steam generator 305. When exhaust tempering is desired, a valve 302 positioned downstream of the first stage of the intercooled compressor 116 closes and a tempering valve 301 opens. This allows air, after being compressed by the first stage of compressor 116 to exit the intercooled compressor 205. This air is generated using about 30% of the fuel that the current tempering air uses, thus significant part load efficiency can be realized. Cool air then passes through a pipe 303 to the manifold 304. When cool air is no longer needed, the above-described process reverses.

Figure 13:
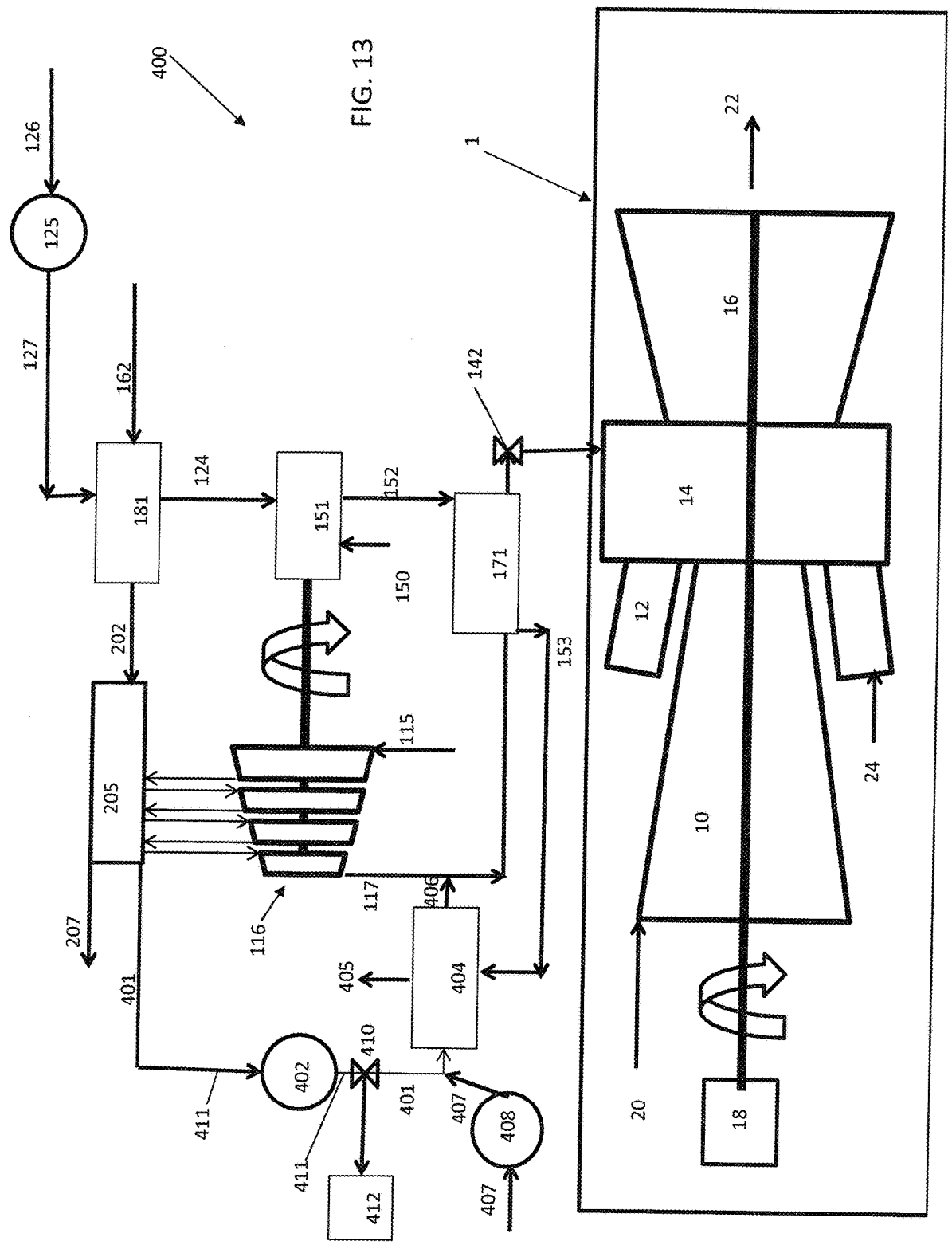
FIG. 13 is a schematic drawing of an embodiment of the present invention delivering power augmentation air to the gas turbine engine while the water condensed in the compression process is reintroduced as steam injection power augmentation to the gas turbine engine.

Another aspect of the invention relates to a water recovery system from the condensate that is generated in the intercooling process. Referring to FIG. 13, a water recovery and steam injection system 400 in accordance with an embodiment of the present invention is disclosed. As the air from compressor 116 is cooled in the compressor intercooler 205, water condenses and the pressure in the intercooler 205 forces the water 401 out of a drain in the intercooler 205. The water 401 is collected and pressurized by a pump 402. After the pump 402, the high pressure water 401 goes through a secondary recuperator 404 where the warm exhaust 153 from the recuperator 171 increases the temperature of the water 401 in the secondary recuperator 404 and turns the water 401 into steam 406. The steam 406 is then injected into the compressed air that is going to the main TPM recuperater 171 and then injected into the compressor discharge plenum 14. The exhaust temperature is reduced in temperature and then exits the secondary recuperator 404 at exit 405.

If additional steam injection is desired, a secondary water source 407 can be similarly pumped into the system 400 by a pump 408 and then sent to the secondary recuperator 404 for heating. Additionally, the inlet air 115 to the supplemental compressor 116 can be intentionally taken from a source of air that has a higher humidity level than ambient air in order to produce more water for reclamation or steam injection purposes. For example, a very common cooling system for a gas turbine energy system is an open cooling tower, where the cooling water is exposed to atmosphere intentionally to promote evaporation which produces cooler cooling water. This evaporation results in a locally higher than ambient humidity and if the supplemental compressor air was taken at this source, more water would be produced in the intercoolers compared to if the air was taken from ambient. By doing this, the power plant can recover otherwise lost water. This water can be used in the TPM as described above or routed back to the plant water make up system.

In an alternate embodiment of the present invention, the water 401 generated by the condensation in the compressor intercooler 205 can be captured and used for other purposes. The water 401 is a result of condensation from the ambient air and therefore is potable drinking water. The water collected can be piped out of the power plant, collected and stored for future use, or used immediately within the power plant. The water can also be piped to an adjacent facility such as in a typical cogeneration facility. In order to facilitate the alternate use or collection of the water generated, a valve 410 is placed in the water line 411, either before or after pump 402, such that the water 401 can be selectively diverted prior to passing through the secondary recuperator 404 used to generate the steam. The water 401 can then be collected in a storage tank 412 or piped away from the power plant (not shown).

Figure 14:
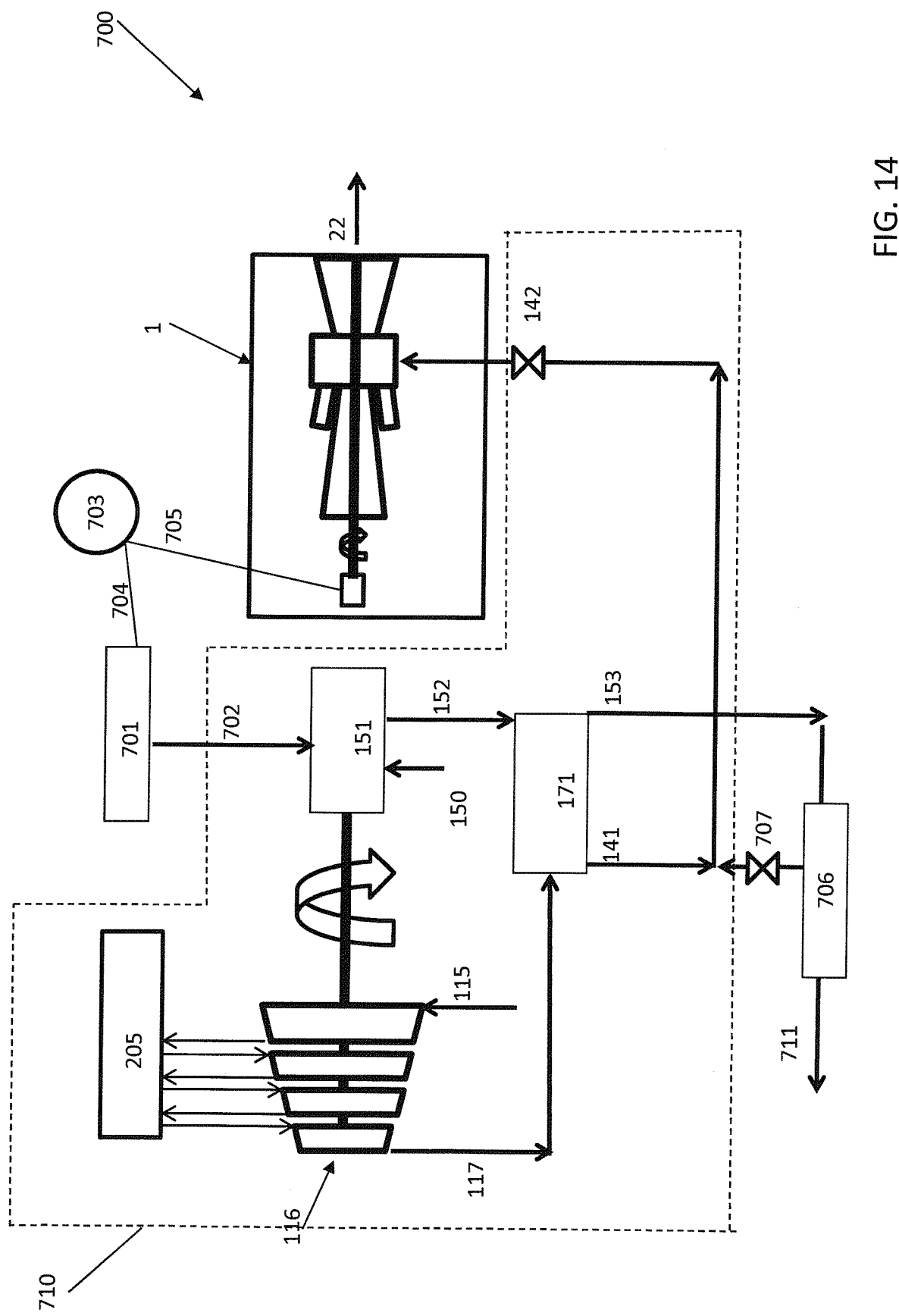
FIG. 14 is a schematic drawing of an embodiment of the present invention having a system for delivering power augmentation air to the gas turbine engine, and a storage system delivering interim power to the same gas turbine engine.

Another aspect of the present invention relates to a combined continuous air injection system 710 coupled with an air storage system 706 and/or a high frequency power regulation device 701 like a battery or a super-capacitor. FIG. 14 shows an air injection system 710 which uses a fueled engine 151 to compress ambient air 115 via a supplemental compressor 116 to produce compressed air 117 that is heated in the recuperator 171 prior to injection into the GT through an injection valve 142. The power augmentation level in the gas turbine is directly proportional to the mass flow of air injected into the GT, typically about 1 MW of power for every 2.5 lb/sec of air injected. For example, a system with a 2 MW engine will produce about 12 lb/sec of air and will cause a 7FA combined cycle power plant to increase about 5 MW in power.

A storage system 706 for use in this embodiment of the present invention is described above and is also shown in FIG. 14. The storage system 706 stores pressurized air and can add the pressurized air to the air injection system 710. In order to increase the power boost from the power plant during times of high ramping or intermittent load demands storage system injection control valve 707 can be opened releasing previously-stored compressed air to combine with compressed air from system 710. The air from the storage system 706 is pre-heated in a second recuperator (not shown) that is part of the storage system 706 using the warm exhaust outlet 153, resulting in relatively cool exhaust, approximately 250 F, being discharged to the atmosphere 711. The heated air from the storage system 706 is mixed with the air 141 from system 710 prior to injection into the GT 1 through the injection control valve 142.

A further addition to the system 700 is a battery and transformer 701, which provides two functions. First, it serves as the power source 702 for starting the air injection system 710 by energizing a starter motor on the fueled engine 151. Secondly, it provides a very high speed regulation capacity 704 to the grid node 703 which is tied to the generator output 705 from the GT 1. Each of these systems has a characteristic response time. The GT 1 responds in minutes, the air injection system 710 responds in about 30-60 seconds, the air storage system 706 responds in 1-30 seconds and the battery 701 responds is milliseconds. By combining these three systems into one system 700 that provides multiple functions, a very economic and high value system results.

Figure 9:
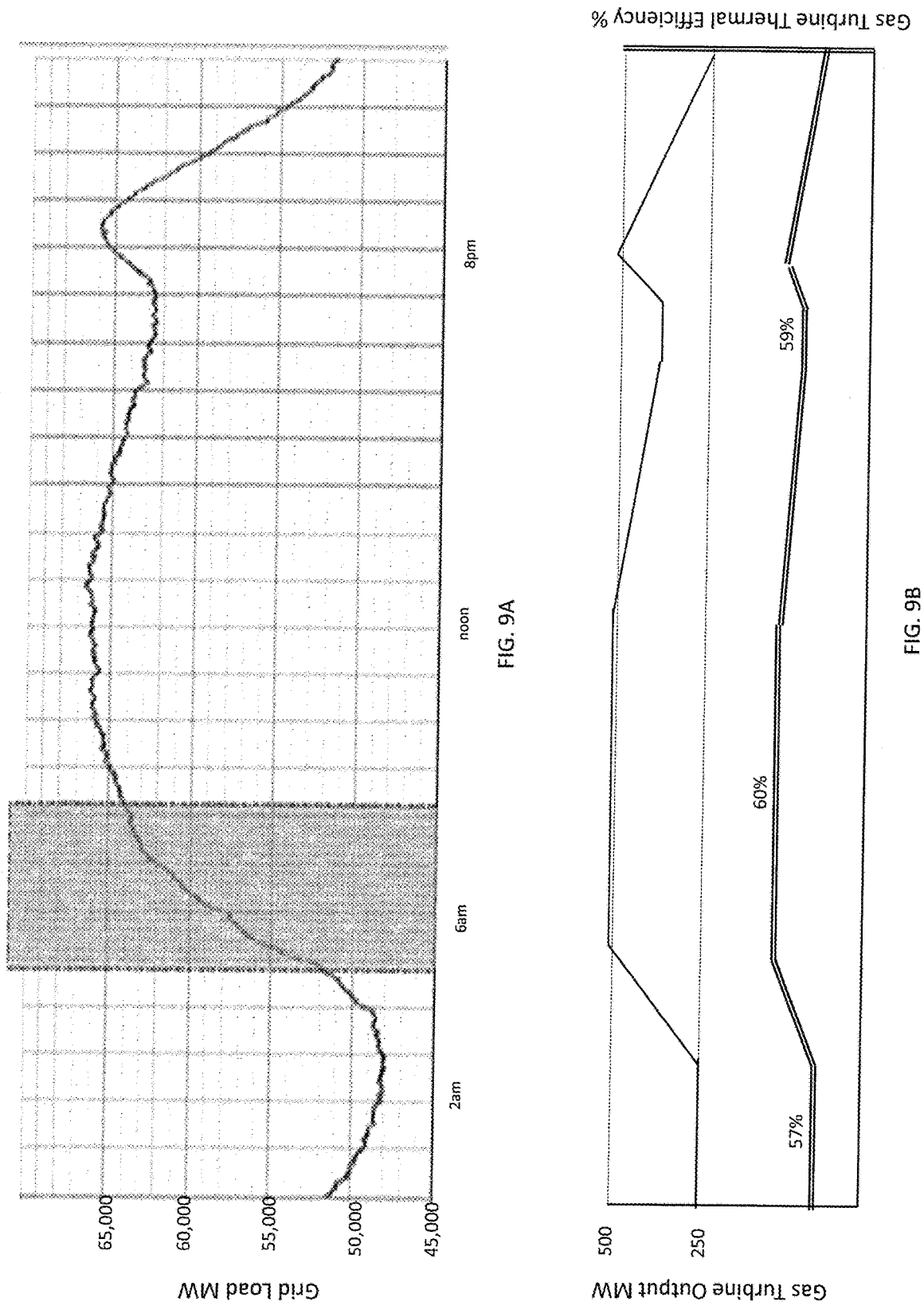
FIG. 9A is a schematic drawing of the typical daily load pattern that exists on an electric grid.
FIG. 9B is a chart depicting output and efficiency versus time of a typical 2×1 F-Class combined cycle gas turbine power plant.
Figure 15A:
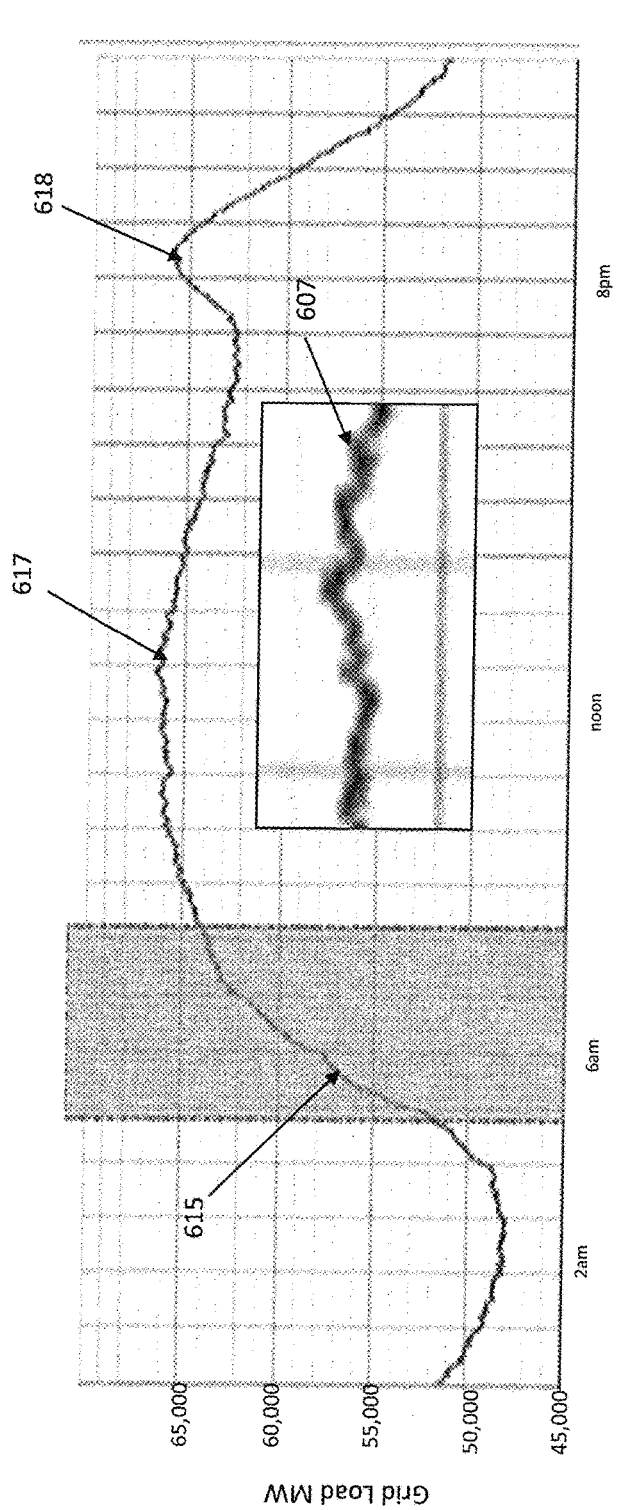
FIG. 15A is a schematic drawing of the typical daily load pattern that exists on an electric grid in which the present invention operates.
Figure 15B:
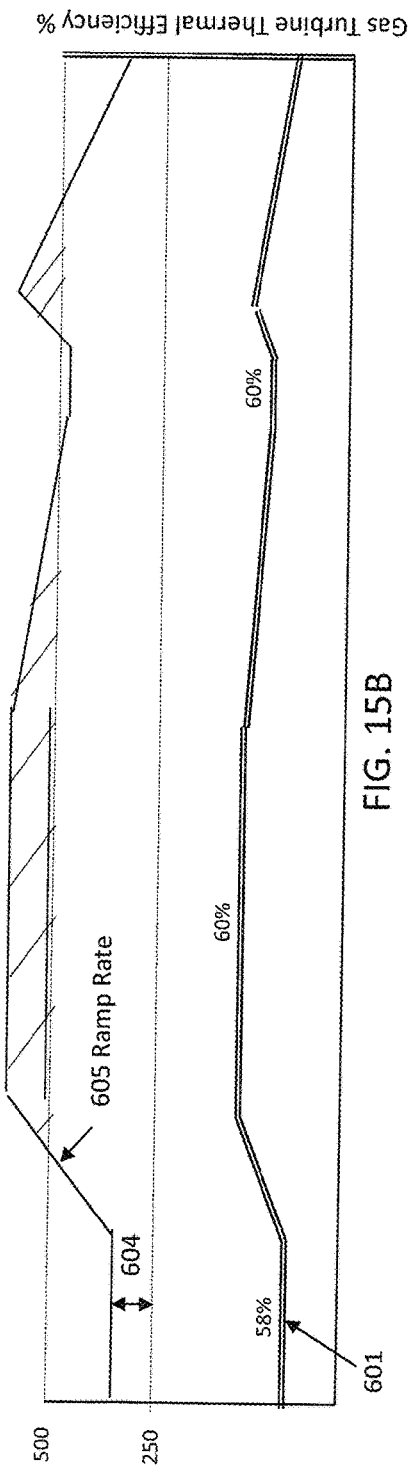
FIG. 15B is a chart depicting output and efficiency versus time for a gas turbine power plant in accordance with an embodiment of the present invention.

FIGS. 15A and 15B shows the typical load pattern for a gas turbine engine where there is an initial ramp up 615, then a relatively level load with a noon peak 617, and then a secondary peak 618 in the evening. By having the present invention operating at a power plant, the nominal output of the power plant can be increased 10 to 20% while providing the same capacity to increase capability, as shown by FIG. 15B as compared to FIG. 9B. This allows the plant to operate about 1% more efficiently during the off-peak times, as shown by 601, 58% in FIG. 15B versus 57% in FIG. 9B.

With the storage system 706 available at the same power plant, the ramp rate of the power plant, depicted as 605, can be matched to the ramp rate of the load, depicted as 615 by selectively releasing air from the storage system 706. In addition, the air from the storage system 706 can be used to cover the extreme peaks experienced during mid-day 617 and the evening 618. The quantity of air in the storage system 706 can be monitored and reserves can be made which could allow other peaking GT plants to start while the air from the storage system is consumed. For example, during the noon peak, depicted as 617 in FIG. 15A, a 50 MW simple cycle peaker, which takes 15 minutes to start, might typically be running at some minimal load to provide the spinning reserve necessary, so there is a combined cycle plant operating at 25 MW below base load and a peaker at 25 MW part load, just to have the 50 MW spinning reserve. With the storage system applied to the GT, the peaker unit could be shut off and the combined cycle at base load, with 15 minutes of reserve air in the storage system to assure enough time to start the peaker unit if higher loads are actually required. This would result in an efficiency improvement to the grid. When the battery system 701 of FIG. 14 is added to the present invention further grid efficiencies can be realized. The high frequency regulation capability, depicted as 607, is proven to reduce the actual amount of regulation required on the grid to maintain frequency control, so with the three systems integrated together, fewer power plants will have to be on line to provide the same level of frequency regulation. The present invention can be tailored in size to meet a specific grid requirement and can be combined or operated separately depending on the grid requirements.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of cooling a gas fueled engine driven intercooled air compressor, comprising:
providing the intercooled air compressor, a gearbox, and the gas fueled engine;
driving the intercooled air compressor with the qas fueled engine to produce a compressed air flow;
delivering the compressed air flow to a system comprising a qas turbine engine;
flowing a liquid coolant from a liquid coolant supply to each of the gearbox and an intercooler of the intercooled air compressor;
recombining the liquid coolant after the gearbox and the intercooler;
directing the recombined liquid coolant via multiple paths to cool the gas fueled engine; and
recombining the liquid coolant after the liquid coolant has passed through the multiple paths.

2. The method of claim 1, wherein the multiple paths include a high temperature path, a low temperature path, and a bypass.

3. The method of claim 2, further comprising fluidly coupling each of the high temperature path, the low temperature path, and the bypass to an exit manifold.

4. The method of claim 3, further comprising using the liquid coolant directed to the high temperature path to cool a jacket of the gas fueled engine.

5. The method of claim 1, wherein the liquid coolant comprises water.

6. The method of claim 5, further comprising adding an additive to the water to preclude freezing of the liquid coolant.

7. A cooling system, comprising:
a compressor comprising at least one intercooler;
a gearbox;
a fueled engine configured to drive the compressor to produce a compressed air flow;
a compressed air line configured to convey the compressed air flow from the compressor to a system comprising a qas turbine engine;
a supply of liquid coolant;
a first manifold configured to recombine the liquid coolant after the liquid coolant has been directed to each of the at least one intercooler and the gearbox;
and a second manifold configured to recombine the liquid coolant after the liquid coolant has been directed via multiple paths to cool the fueled engine;
wherein each of the second manifold and the multiple paths is downstream of the first manifold.

8. The cooling system of claim 7, wherein the fueled engine is a gas fueled reciprocating engine.

9. The cooling system of claim 7, wherein the multiple paths include a high temperature path, a low temperature path, and a bypass.

10. The cooling system of claim 9, wherein the liquid coolant in the high temperature path is configured to cool a jacket of the fueled engine.

11. The cooling system of claim 7, wherein the at least one intercooler comprises a plurality of intercoolers.

12. The cooling system of claim 11, wherein each of the plurality of intercoolers has a coolant exit associated therewith; each of the plurality of coolant exits being upstream of the first manifold and being fluidly coupled to a third manifold; the third manifold being configured to recombine the liquid coolant after it has been directed to each of the plurality of intercoolers.

13. The cooling system of claim 7, wherein:
the fuel engine is a gas fueled reciprocating engine; and
the liquid coolant is conveyed from the second manifold to a cooling system outlet.

14. A method for cooling an intercooled air compressor, comprising:
driving a compressor comprising an intercooler with a device to produce a compressed air flow;
delivering the compressed air flow to a system comprising a gas turbine engine;
flowing a liquid coolant from a liquid coolant supply to each of a gearbox and the intercooler;
recombining the liquid coolant after the gearbox and the intercooler;
directing the recombined liquid coolant via multiple paths to cool the device; and
recombining the liquid coolant after the liquid coolant has passed through the multiple paths.

15. The method of claim 14, wherein the device is a gas fueled reciprocating engine.

16. The method of claim 15, wherein the multiple paths include a high temperature path, a low temperature path, and a bypass.

17. The method of claim 16, further comprising fluidly coupling each of the high temperature path, the low temperature path, and the bypass to an exit manifold.

18. The method of claim 17, wherein the intercooler includes a plurality of intercoolers.

19. The method of claim 18, further comprising providing a manifold to recombine the liquid coolant flowing from each of the plurality of intercoolers.

20. The method of claim 18, wherein the liquid coolant comprises water and an additive configured to preclude freezing of the liquid coolant.

* * * * *